United States Patent
Kim et al.

(10) Patent No.: US 10,110,267 B2
(45) Date of Patent: Oct. 23, 2018

(54) METHOD OF SWITCHING ANTENNA FOR REDUCING SPECIFIC ABSORPTION RATE AND ELECTRONIC DEVICE SUPPORTING THE SAME

(71) Applicant: Samsung Electronics Co., Ltd., Gyeonggi-do (KR)

(72) Inventors: Seonil Kim, Gyeonggi-do (KR); Gyusub Kim, Seoul (KR); Hongil Kwon, Gyeonggi-do (KR); Youngmin Joo, Seoul (KR); Kyungjung Kim, Gyeonggi-do (KR); Seongeun Kim, Gyeonggi-do (KR); Jungsik Park, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 15/630,517

(22) Filed: Jun. 22, 2017

(65) Prior Publication Data
US 2017/0373712 A1     Dec. 28, 2017

(30) Foreign Application Priority Data
Jun. 22, 2016     (KR) .................. 10-2016-0077795

(51) Int. Cl.
| | | |
|---|---|---|
| H04B 7/02 | (2018.01) | |
| H04B 7/06 | (2006.01) | |
| H04B 1/3827 | (2015.01) | |
| H04B 17/318 | (2015.01) | |
| H01Q 1/24 | (2006.01) | |
| H01Q 3/24 | (2006.01) | |
| H04B 7/08 | (2006.01) | |

(52) U.S. Cl.
CPC .......... *H04B 1/3833* (2013.01); *H01Q 1/243* (2013.01); *H01Q 3/242* (2013.01); *H04B 1/3838* (2013.01); *H04B 7/0608* (2013.01); *H04B 7/0814* (2013.01); *H04B 7/0834* (2013.01); *H04B 17/318* (2015.01)

(58) Field of Classification Search
CPC ...... H04B 1/3833; H04B 17/318; H04B 7/02; H04B 7/0602; H04B 7/0604
See application file for complete search history.

(56) References Cited

U.S. PATENT DOCUMENTS

| | | | |
|---|---|---|---|
| 7,581,041 B1 | 8/2009 | Whitby-Strevens et al. | |
| 2006/0220870 A1* | 10/2006 | Kimura ................ | G06K 7/0008 340/572.7 |
| 2007/0184883 A1* | 8/2007 | Tanaka .................... | H01Q 1/24 455/575.7 |
| 2010/0159854 A1* | 6/2010 | Kim ........................ | H04B 7/04 455/101 |
| 2012/0142291 A1 | 6/2012 | Rath et al. | |

(Continued)

OTHER PUBLICATIONS

European Search Report dated Nov. 9, 2017 issued in counterpart application No. 17177386.4-1874, 12 pages.

*Primary Examiner* — Andrew Wendell
(74) *Attorney, Agent, or Firm* — The Farrell Law Firm, P.C.

(57) ABSTRACT

An electronic device and method are provided for switching an antenna for SAR reduction. The method includes sequentially switching, based on a predetermined schedule, a plurality of antennas having different main emission directions, when transmitting a wireless signal.

20 Claims, 16 Drawing Sheets

(56) References Cited

U.S. PATENT DOCUMENTS

| | | | |
|---|---|---|---|
| 2013/0027267 A1* | 1/2013 | Homan | A61B 1/00016 343/810 |
| 2013/0035051 A1* | 2/2013 | Mujtaba | H04B 7/0808 455/277.2 |
| 2013/0045700 A1 | 2/2013 | Stallman et al. | |
| 2013/0156080 A1* | 6/2013 | Cheng | H01Q 1/243 375/222 |
| 2013/0310045 A1* | 11/2013 | Yan | H04B 7/0608 455/437 |
| 2015/0042514 A1 | 2/2015 | Nysen et al. | |
| 2016/0174168 A1 | 6/2016 | Lu et al. | |
| 2017/0054464 A1* | 2/2017 | Peng | H04B 1/3838 |

* cited by examiner

METHOD OF SWITCHING ANTENNA FOR REDUCING SPECIFIC ABSORPTION RATE AND ELECTRONIC DEVICE SUPPORTING THE SAME

PRIORITY

This application claims priority under 35 U.S.C. § 119(a) to Korean Patent Application Serial No. 10-2016-0077795, which was filed in the Korean Intellectual Property Office on Jun. 22, 2016, the entire content of which is incorporated herein by reference.

BACKGROUND

1. Field of the Disclosure

The present disclosure relates generally to an electronic device, and more particularly, to a method of switching an antenna for specific absorption rate (SAR) reduction and an electronic device that supports the same.

2. Description of the Related Art

When an antenna transmits electromagnetic waves with high power, a SAR to be absorbed into a human body may increase. In this case, the increased SAR should remain below an allowable SAR reference value. When the SAR exceeds the SAR reference value because of high power of the antenna, in order to remain below the SAR reference value, the electronic device may lower the antenna power. When the electronic device approaches the human body, the electronic device reduces antenna power to decrease a specific absorption rate to be absorbed into the human body.

When the SAR exceeds a SAR reference value because of high power of the antenna, in order to remain below the SAR reference value, the electronic device reduces antenna power, therefore, communication performance of the antenna may be lowered.

SUMMARY

An aspect of the present disclosure provides a method of switching an antenna for SAR reduction and an electronic device that supports the same and may have a plurality of antennas having different main emission directions.

Another aspect of the present disclosure provides a method of switching an antenna for SAR reduction and an electronic device that supports the same and may provide a communication service with high performance by switching a plurality of antennas at a predetermined time interval for a predetermined time.

Another aspect of the present disclosure provides a method of switching an antenna for SAR reduction and an electronic device that supports the same and may reduce a SAR without reducing antenna power by controlling a plurality of antennas having the same frequency band at a predetermined time interval for a predetermined time.

Another aspect of the present disclosure provides a method of switching an antenna for SAR reduction and an electronic device that supports the same and may transmit and receive a wireless signal using only antennas having high receive signal strength, except for at least one antenna in which receive signal strength reduces to be less than or equal to a reference value, when the receive signal strength of at least one antenna of a plurality of antennas reduces to be less than or equal to a reference value.

Another aspect of the present disclosure provides a method of switching an antenna for SAR reduction and an electronic device that supports the same and may provide high communication performance while reducing a SAR by adjusting a time that a wireless signal is transmitted and received using at least one antenna, when a change in power of at least one antenna of a plurality of antennas is detected.

In accordance with an aspect of the present disclosure, an electronic device is provided which includes a communication unit; a plurality of antennas; a switch unit that electrically connects the communication unit and the plurality of antennas; and a processor configured to control the switch unit to sequentially switch the plurality of antennas based on a predetermined schedule, in order to transmit the wireless signal through the plurality of antennas having different main emission directions.

In accordance with another aspect of the present disclosure, a method of switching an antenna for SAR reduction of an electronic device is provided, which includes sequentially switching a plurality of antennas having different main emission directions based on a predetermined schedule, when transmitting a wireless signal.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
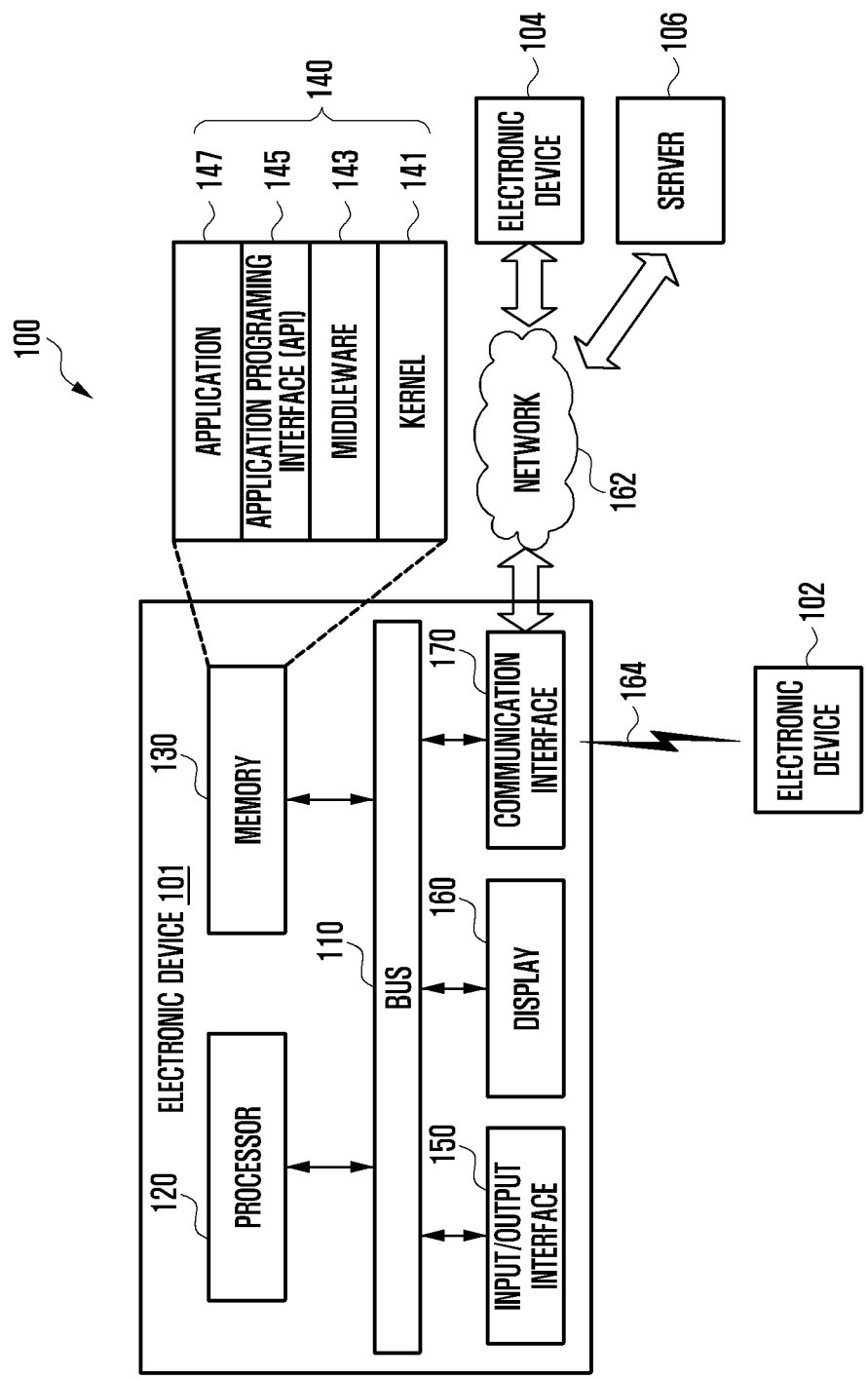
FIG. 1 illustrates a network environment according to an embodiment of the present disclosure.

Hereinafter, the present disclosure is described with reference to the accompanying drawings. Although certain embodiments are illustrated in the drawings and related detailed descriptions are discussed in the present disclosure, the present disclosure may have various modifications and embodiments. However, embodiments of the present disclosure are not limited to a specific implementation form and it should be understood that the present disclosure includes all changes and/or equivalents and substitutes included in the spirit and scope of various embodiments of the present disclosure. In describing the drawings, similar components may be designated by similar reference numerals.

In the present disclosure, terms such as "include", "have", "may include", and "may have" may be construed to denote a certain characteristic, number, step, operation, element, component, or a combination thereof, but may not be construed to exclude the existence of or a possibility of addition of one or more other characteristics, numbers, steps, operations, elements, components, or combinations thereof.

In the present disclosure, the expressions "or" or "at least one of A or/and B" include any or all of combinations of words listed together. The expressions "A or B" or "at least A or/and B" may include A, may include B, or may include both A and B.

The expressions "1", "2", "first", or "second" as used in the present disclosure may modify various components of the various embodiments but do not limit the corresponding components. The above expressions do not limit the sequence and/or importance of the components. The expressions may be used for distinguishing one component from other components. For example, a first user device and a second user device may indicate different user devices although both of them are user devices. Without departing from the scope of the present disclosure, a first structural element may be referred to as a second structural element. Similarly, the second structural element also may be referred to as the first structural element.

When a component is "(operatively or communicatively) coupled to" or "connected to" another component, the component may be directly coupled or connected to another component or another component may exist between the component and the another component. However, when a component is "directly coupled to" or "directly connected to" another component, a third component does not exist therebetween.

The expression "configured (or set) to do" may be used interchangeably with "suitable for doing," "having the capacity to do," "designed to do," "adapted to do," "made to do," or "capable of doing." The expression "configured (or set) to do" may not necessarily refer to hardware for which it is "specifically designed to do." Instead, the expression "a device configured to do" may indicate that the device is "capable of doing" something with other devices or parts. The expression "a processor configured (or set) to do A, B and C" may refer to a dedicated processor (e.g., an embedded processor) or a general-purpose processor (e.g., CPU or application processor or any other processing circuitry) that may execute one or more software programs stored in a memory device to perform corresponding functions.

According to an embodiment of the present disclosure, an electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and a wearable device, etc. Examples of the wearable device may include an accessory type device (such as a watch, ring, bracelet, ankle bracelet, necklace, glasses, contact lens, and head-mounted device (HMD)), a textile or clothes type device (such as electronic clothes), a body-attached type (such as skin pad and tattoo), and a bio-implanted type, etc., but is not limited thereto.

An electronic device may also include a television, a digital video disc (DVD) player, an audio player, a refrigerator, an air conditioner, a cleaner, an oven, a microwave oven, a laundry machine, an air purifier, a set-top box, a home automation control panel, a security control panel, a media box (such as Samsung HomeSync™, Apple TV™, and Google TV™), a game console (such as Xbox™ and PlayStation™), an electronic dictionary, an electronic key, a camcorder, and an electronic frame, etc.

An electronic device may also include a medical device (such as a portable medical sensor (including a glucometer, a heart rate sensor, a tonometer, and a body thermometer), a magnetic resonance angiography (MRA) device, a magnetic resonance imaging (MRI) device, a computed tomography (CT) device, a camcorder, and a microwave scanner), a navigation device, a global navigation satellite system (GNSS), an event data recorder (EDR), a flight data recorder (FDR), an automotive infotainment device, marine electronic equipment (such as a marine navigation system and a gyro compass), aviation electronics (avionics), an automotive head unit, an industrial or household robot, an automatic teller machine (ATM), a point of sales (POS) terminal, and an Internet-of-things (IoT) device (such as an electric bulb, a sensor, a sprinkler system, a fire alarm system, a temperature controller, a street lamp, a toaster, fitness equipment, a hot water tank, a heater, and a boiler), etc.

An electronic device may include furniture, a building/structure, a part of a vehicle, an electronic board, an electronic signature receiving device, a projector, and a sensor (such as water, electricity, gas, and electric wave meters), etc.

An electronic device may be flexible device and/or a combination of at least two of the aforementioned devices.

An electronic device is not limited to the aforementioned devices.

In the present disclosure, the term "user" may denote a person who uses the electronic device or a device (e.g., artificial intelligent electronic device) which uses the electronic device.

FIG. 1 illustrates a network environment according to an embodiment of the present disclosure.

Referring to FIG. 1, an electronic device 101 may be connected to a first external device 102 through short-range communication 164. The electronic device 101 may be connected to a second external device 104 or a server 106 through a network 162.

The electronic device 101, in a network environment 100, includes a bus 110, a processor (e.g., including processing circuitry) 120, a memory 130, an input/output interface (e.g., including input/output circuitry) 150, a display 160, and a communication interface (e.g., including communication circuitry) 170. The electronic device 101 may omit at least one of the components or further include another component.

The bus 110 may be a circuit connecting the above described components 120-170 and transmitting communication (e.g., a control message or data) between the above described components.

The processor 120 may include various processing circuitry, e.g., one or more of a dedicated processor, a central processing unit (CPU), application processor (AP) or communication processor (CP). The processor 120 may control at least one component of the electronic device 101 and/or execute instructions relating to communication or data processing.

The memory 130 may include volatile and/or non-volatile memory. The memory 130 may store command or data relating to at least one component of the electronic device 101. The memory 130 may store software and/or program 140. The program 140 includes a kernel 141, middleware 143, an application programming interface (API) 145, and an application 147. At least one portion of the kernel 141, the middleware 143 and the API 145 may be defined as an operating system (OS).

The kernel 141 controls or manages system resources (e.g., the bus 110, the processor 120, or the memory 130) used for executing an operation or function implemented by the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130, etc.) of the electronic device 101 may be used, to the application 147.

The API 145 is an interface by which the application 147 may control a function provided by the kernel 141 or the middleware 143 and includes at least one interface or function (e.g., command) for a file control, a window control, image processing, or a character control.

The input/output interface 150 may include various input/output circuitry configured to provide an interface to transmit command or data input by a user or another external device to another component(s) of the electronic device 101. Further, the input/output interface 150 may output the command or data received from another component(s) of the electronic device 101 to the user or another external device.

The display 160 may include a liquid crystal display (LCD), a light emitting diode (LED), an organic LED (OLED), a micro electro mechanical system (MEMS) display, an electronic paper display, etc. The display 160 may display various content (text, image, video, icon, or symbol) to a user. The display 160 may include a touch screen, and receive touch, gesture, approaching, or hovering inputs using a part of a body of the user.

The communication interface 170 may include various communication circuitry configured to set communication of the electronic device 101 and the first external device 102, the second external device 104, or the server 106. The communication interface 170 may be connected with the network 162 through wireless communication or wired communication and communicate with the second external device 104 or server 106.

Wireless communication may use, as a cellular communication protocol, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), etc.

A short-range communication 164 may include Wi-Fi, Bluetooth™, near field communication (NFC), magnetic secure transmission (MST) or near field magnetic data stripe transmission, and global navigation satellite system (GNSS), etc. The GNSS may include a global positioning system (GPS), a global navigation satellite system (Glonass), a Beidou navigation satellite system (Beidou), and Galileo (European global satellite-based navigation system). Hereinafter, the term "GPS" may be interchangeably used with the term "GNSS" in the present disclosure.

Wired communication may include universal serial bus (USB), high definition multimedia interface (HDMI), recommended standard-232 (RS-232), plain old telephone service (POTS), etc. The network 162 may include a telecommunication network, a computer network (e.g., LAN or WAN), the Internet, and a telephone network.

Each of the first external device 102 and the second external device 104 may be the same type or a different type of device than the electronic device 101. The server 106 may include one or more group of servers. At least one function executed by the electronic device may be performed by the first and second external electronic device 102, 104, or server 106. When the electronic device 101 performs a function or service automatically, the electronic device 101 may request performing of at least one function to the first and second external electronic device 102, 104, or server 106. The first and second external electronic device 102, 104, or server 106 may perform the requested function or additional function, and may transfer a result of the performance to the electronic device 101. The electronic device 101 may additionally process the received result to provide the requested function or service. For the above, cloud computing technology, distributed computing technology, or client-server computing technology may be used.

Figure 2:
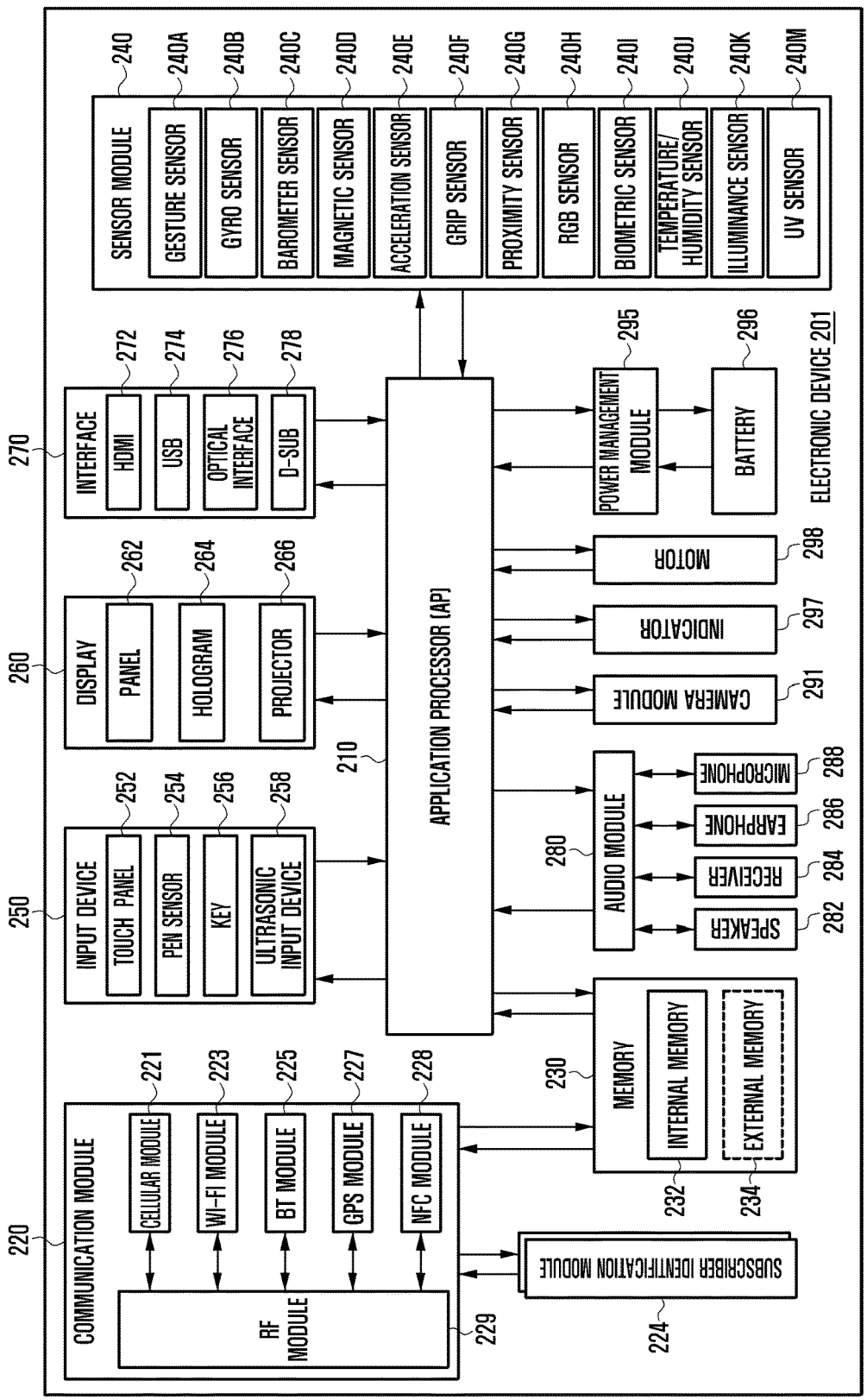
FIG. 2 illustrates an electronic device according to an embodiment of the present disclosure.

FIG. 2 illustrates an electronic device according to an embodiment of the present disclosure.

Referring to FIG. 2, an electronic device 201 includes one or more application processors (AP) 210, a communication module 220, a subscriber identification module (SIM) 224 card, a memory 230, a sensor module 240, an input device 250, a display 260, an interface 270, an audio module 280, a camera module 291, a power managing module 295, a battery 296, an indicator 297, and a motor 298.

The AP 210 may include various processing circuitry and execute an OS or an application program to control a plurality of hardware or software component elements connected to the AP 210 and execute various data processing and calculations including multimedia data. The AP 210 may be implemented by a system on chip (SoC). The processor 210 may further include a graphics processing unit (GPU) and/or image signal processor. The AP 210 may include at least one portion of components illustrated in FIG. 2 (e.g., a cellular module 221). The AP 210 may load command or data received from another component (e.g., non-volatile memory), and store various data in the non-volatile memory.

The communication module 220 includes a cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an Internet service through a communication network (e.g., LTE, LTE-A, CDMA, WCDMA, UMTS, WiBro, GSM, etc.). Further, the cellular module 221 may distinguish and authenticate electronic devices within a communication network using SIM 224. The cellular module 221 performs at least some of the functions which may be provided by the AP 210. The cellular module 221 may perform at least some of the multimedia control functions. The cellular module 221 may include a CP.

Each of the Wi-Fi module 223, the BT module 225, the GPS module 227, and the NFC module 228 may include a processor for processing data transmitted/received through the corresponding module.

At least part of the cellular module 221, the Wi-Fi module 223, the BT module 225, the GPS module 227, and the NFC module 228 may be included in one integrated chip (IC) or one IC package.

The RF module 229 transmits/receives data using an RF signal. The RF module 229 may include a transceiver, a power amp module (PAM), a frequency filter, a low noise amplifier (LNA), antenna, etc.

At least one of the cellular module 221, the Wi-Fi module 223, the BT module 225, the GPS module 227, and the NFC module 228 may transmit/receive an RF signal through a separate RF module.

The SIM 224 may refer to a card including a SIM and may be inserted into a slot formed in a particular portion of the electronic device. The SIM 224 includes unique identification information (e.g., integrated circuit card identifier (IC-CID)) or subscriber information (e.g., international mobile subscriber identity (IMSI)).

The memory 230 includes an internal memory 232 and/or an external memory 234. The internal memory 232 may include a volatile memory (e.g., a random access memory (RAM), a dynamic RAM (DRAM), a static RAM (SRAM), a synchronous dynamic RAM (SDRAM), etc.), and a non-volatile memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, etc.), a hard drive, a solid state drive (SSD), etc.

The external memory 234 may further include a flash drive a compact flash (CF), a secure digital (SD), a micro-SD, a mini-SD, an extreme digital (xD), and/or a memory stick. The external memory 234 may be functionally connected to the electronic device 201 through various interfaces. The electronic device 201 may further include a storage device (or storage medium) such as a hard drive.

The sensor module 240 measures a physical quantity or detects an operation state of the electronic device 201, and converts the measured or detected information to an electronic signal. The sensor module 240 includes a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illuminance (e.g., light) sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, a fingerprint sensor, etc. The sensor module 240 may further include a control circuit for controlling one or more sensors included in the sensor module 240.

The electronic device 201 may include a second processor, configured as part of the processor 210 or a separate component, for controlling the sensor module 240. In this case, while the processor 210 is operating in sleep mode, the second processor is capable of controlling the sensor module 240.

The input device 250 includes a touch panel 252, a (digital) pen sensor 254, a key 256, and an ultrasonic input device 258. The touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer, such that the touch panel 252 provides a tactile reaction to the user.

The (digital) pen sensor 254 may be implemented using a method identical or similar to a method of receiving a touch input of the user, or using a separate recognition sheet.

The key 256 may include a physical button, an optical key, or a key pad.

The ultrasonic input device 258 may detect an acoustic wave by a microphone 288 through an input means generating an ultrasonic signal.

The display 260 includes a panel 262, a hologram unit or device 264, and a projector 266. The panel 262 may be implemented to be flexible, transparent, and/or wearable. The panel 262 may also be incorporated into one module together with the touch panel 252. The panel 262 may include a pressure sensor (or force sensor) capable of measuring the intensity of the pressure of the user's touch. The pressure sensor may be integrated with the touch panel 252, or may be implemented by one or more sensors separate from the touch panel 252.

The hologram device 264 shows a stereoscopic image in the air using interference of light.

The projector 266 projects light on a screen to display an image. The screen may be located inside or outside the electronic device 201.

The interface 270 includes an HDMI 272, a USB 274, an optical interface 276, and a D-subminiature (D-sub) 278. Additionally or alternatively, the interface 270 may include a mobile high-definition link (MHL) interface, an SD card/multi-media card (MMC), or an infrared data association (IrDA) standard interface.

The audio module 280 bi-directionally converts a sound and an electronic signal. The audio module 280 processes sound information input or output through a speaker 282, a receiver 284, an earphone 286, the microphone 288, etc.

The camera module 291 is a device which may photograph a still image and a video. The camera module 291 may include one or more image sensors (e.g., a front sensor or a back sensor), an image signal processor (ISP) or a flash (e.g., an LED or xenon lamp).

The power management module 295 manages power of the electronic device 201. The power management module 295 may include a power management integrated circuit (PMIC), a charger IC, or a battery gauge.

The PMIC may be mounted to an integrated circuit or an SoC semiconductor. A charging method may be wired and wireless methods. The charger IC charges a battery and prevents over voltage or over current from a charger. The charger IC includes a charger IC for the wired charging method and the wireless charging method. The wireless charging method may include a magnetic resonance method, a magnetic induction method and an electromagnetic wave method, and additional circuits for wireless charging, e.g., a coil loop, a resonant circuit, a rectifier, etc., may be added.

The battery gauge measures a remaining charge quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular operating states of the electronic device 201 or a part (e.g., AP 210) of the electronic device 201, e.g., a booting status, a message status, a charging status, etc.

The motor 298 converts an electrical signal to a mechanical vibration.

The electronic device 201 may include a processing unit (e.g., GPU) for supporting a mobile TV. The processing unit for supporting the mobile TV may process media data according to a standard of digital multimedia broadcasting (DMB), digital video broadcasting (DVB), MediaFlo™, etc.

Each of the components of the electronic device may be implemented by one or more components and the name of the corresponding component may vary depending on a type of the electronic device. The electronic device may include the above described components, a few of the components may be omitted, or additional components may be further included. Also, some of the components of the electronic device may be combined to form a single entity, and thus may equivalently execute functions of the corresponding components before being combined.

Figure 3:
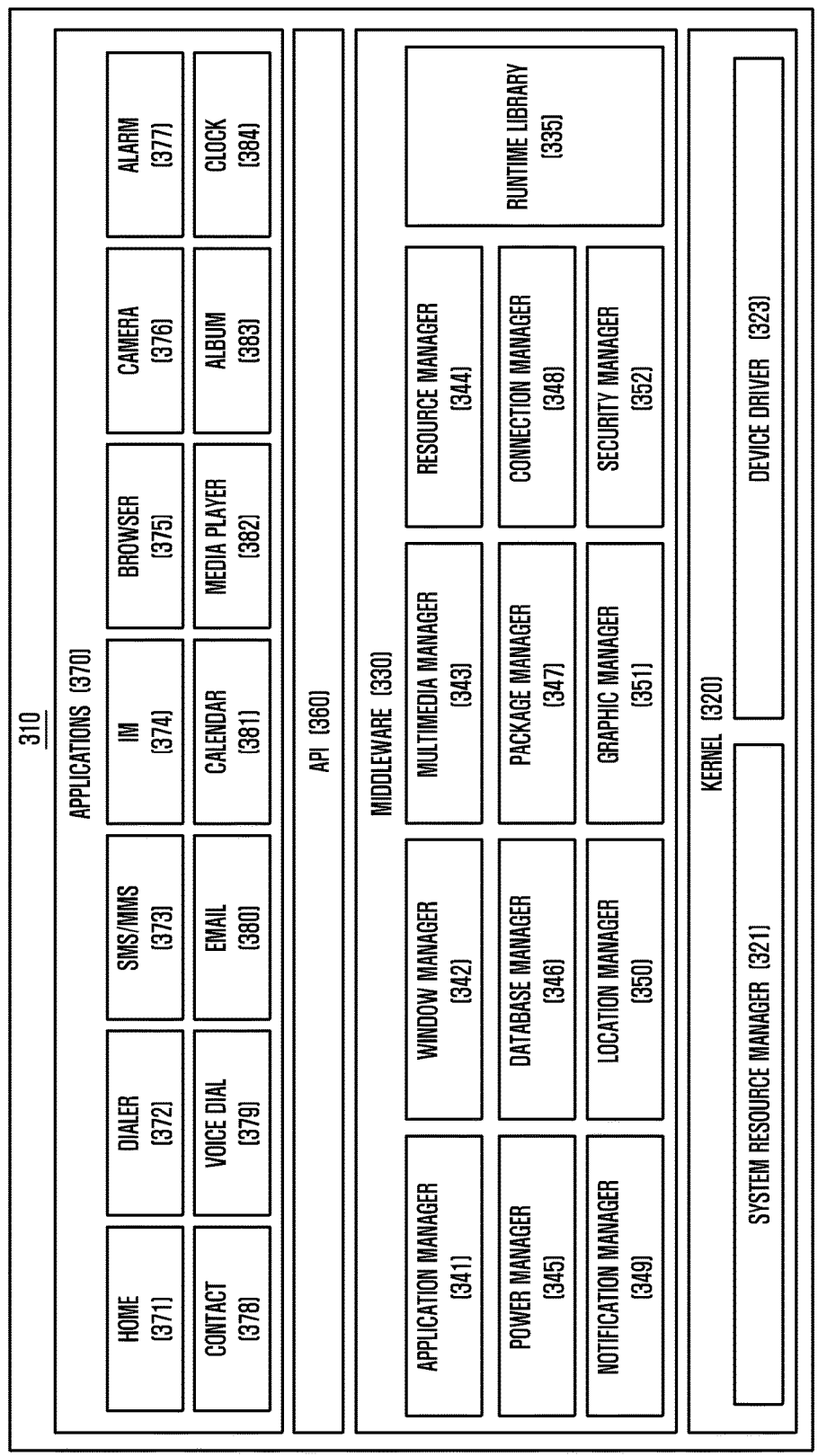
FIG. 3 illustrates a program module according to an embodiment of the present disclosure.

FIG. 3 illustrates a program module according to an embodiment of the present disclosure.

Referring to FIG. 3, a programming module 310 may be stored in the memory 130 of the electronic apparatus 100. At least a part of the programming module 310 may be realized by software, firmware, hardware, and/or combinations of two or more thereof. The programming module 310 may include an OS that is implemented in hardware, e.g., the hardware 200 to control resources related to an electronic device, e.g., the electronic device 100, and/or various applications. e.g., application 147, driven on the OS. The OS may be Android™, iOS™, Windows™, Symbian™, Tizen™, Bada™, etc.

Referring to FIG. 3, the programming module 310 includes a kernel 320, middleware 330, an API 360, and applications 370. At least part of the program module 310 may be preloaded on the electronic device or downloaded from the first and second external electronic device 102, 104, or the server 106.

The kernel 320 includes a system resource manager 321 and/or a device driver 323. The system resource manager 321 may control, allocate, and/or collect system resources. The system resource manager 321 may include a process manager, a memory manager, and a file system manager. The device driver 323 may include a display driver, a camera driver, a BT driver, a shared memory driver, a USB driver, a keypad driver, a Wi-Fi driver, and an audio driver. Further, the device driver 323 may include an inter-process communication (IPC) driver.

The middleware 330 may include a plurality of modules for providing functions commonly used by the applications 370. Further, the middleware 330 may provide the functions through the API 360 such that the applications 370 may efficiently use restricted system resources within the electronic apparatus. The middleware 330 includes a runtime library 335, an application manager 341, a window manager 342, a multimedia manager 343, a resource manager 344, a power manager 345, a database manager 346, a package manager 347, a connectivity (e.g., connection) manager 348, a notification manager 349, a location manager 350, a graphic manager 351, and a security manager 352.

The runtime library 335 may include a library module that a compiler uses in order to add a new function through a programming language while one of the applications 370 is being executed. The runtime library 335 may perform an input/output, memory management, and/or a function for an arithmetic function.

The application manager 341 may manage a life cycle of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of the applications 370.

The power manager 345 may manage a battery and/or power, while operating together with a basic input/output system (BIOS), and may provide power information used for operation. The database manager 346 may manage generation, search, and/or change of a database to be used by the applications 370. The package manager 347 may manage installation and/or an update of an application distributed in a form of a package file.

The connectivity manager 348 may manage wireless connectivity such as Wi-Fi or BT.

The notification manager 349 may display and/or notify of an event, such as an arrival message, a proximity notification, etc.

The location manager 350 may manage location information of an electronic apparatus.

The graphic manager 351 may manage a graphic effect which will be provided to a user, and/or a user interface related to the graphic effect.

The security manager 352 may provide all security functions used for system security and/or user authentication. When the electronic apparatus has a telephone call function, the middleware 330 may further include a telephony manager for managing a voice and/or video communication function of the electronic apparatus.

The middleware 330 may generate and use a new middleware module through various functional combinations of the aforementioned internal element modules. The middleware 330 may provide modules specialized according to types of OSs in order to provide differentiated functions. Further, the middleware 330 may dynamically remove some of the existing elements and/or add new elements. Accordingly, the middleware 330 may exclude some of the elements described, further include other elements, and/or substitute the elements with elements having a different name and performing a similar function.

The API 360 is a set of API programming functions, and may be provided with a different configuration according to the OS. For example, in a case of Android™ or iOS™, one API set may be provided for each of platforms, and in a case of Tizen™, two or more API sets may be provided.

The applications 370 include one or more applications for performing various functions, including home 371, dialer 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.).

Additionally or alternatively, the applications 370 may include an application for supporting information exchange between an electronic device and an external device, which is hereafter called 'information exchange application'. The information exchange application is capable of including a notification relay application for relaying specific information to external devices or a device management application for managing external devices.

The notification relay application is capable of including a function for relaying notification information, created in other applications of the electronic device to external devices. In addition, the notification relay application is capable of receiving notification information from external devices to provide the received information to the user.

The device management application is capable of managing (e.g., installing, removing, or updating) at least one function of an external device communicating with the electronic device. Examples of the function are a function of turning-on/off the external device or part of the external device, a function of controlling the brightness (or resolution) of the display, applications running on the external device, services provided by the external device, etc. Examples of the services are a call service, a messaging service, etc.

The applications 370 may include an application (e.g., a health care application of a mobile medical device, etc.) specific to the attributes of an external device. The applications 370 may include applications received from an external device. The applications 370 may include a preloaded application or third party applications that may be downloaded from a server. Components of the program module 310 may be referred to with different names according to types of operating systems.

At least part of the program module 310 may be implemented with software, firmware, hardware, or any combination of at least two of them. At least part of the program module 310 may be implemented (e.g., executed) by the processor 210. At least part of the programming module 310 may include modules, programs, routines, sets of instructions or processes, etc., in order to perform one or more functions.

The term "module" as used in the present disclosure may refer to a unit including at least one combination of hardware (e.g., circuitry), software, and firmware. The term "module" may be interchangeably used with terms such as "unit", "logic", "logical block", "component", and/or "circuit". The "module" may be a minimum unit of an integrally configured article and/or a part thereof. The "module" may be a minimum unit performing at least one function and/or a part thereof. The "module" may be mechanically and/or electronically implemented. The "module" may include processing circuitry (e.g., a CPU), a dedicated processor, an application-specific IC (ASIC) chip, a field-programmable gate arrays (FPGA), and a programmable-logic device for performing operations which are known and/or are to be developed.

At least some of the devices (e.g., modules or functions thereof) or the method (e.g., operations) may be implemented by instructions or commands stored in a computer-readable storage medium in a programming module form. When the instructions are executed by at least one processor 120, the at least one processor 120 may perform functions corresponding to the instructions. The computer-readable storage medium may be the memory 130. At least a part of the programming module may be implemented (e.g., executed) by the processor 120. At least some of the programming modules may include a module, a program, a routine, a set of instructions or a process for performing one or more functions.

The computer-readable storage medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction (e.g., programming module), such as a ROM, a RAM, a flash memory, etc. In addition, the program instructions may include high level language codes, which may be executed in a computer by using an interpreter, as well as machine codes made by a compiler. The aforementioned hardware device may be configured to operate as one or more software modules in order to perform the operation of the disclosure, and vice versa.

The module or programming module may include the aforementioned components with omission of some components or addition of other components. The operations of the modules, programming modules, or other components may be executed in series, in parallel, recursively, or heuristically. Also, some operations may be executed in different order, omitted, or extended with other operations.

Figure 4A:
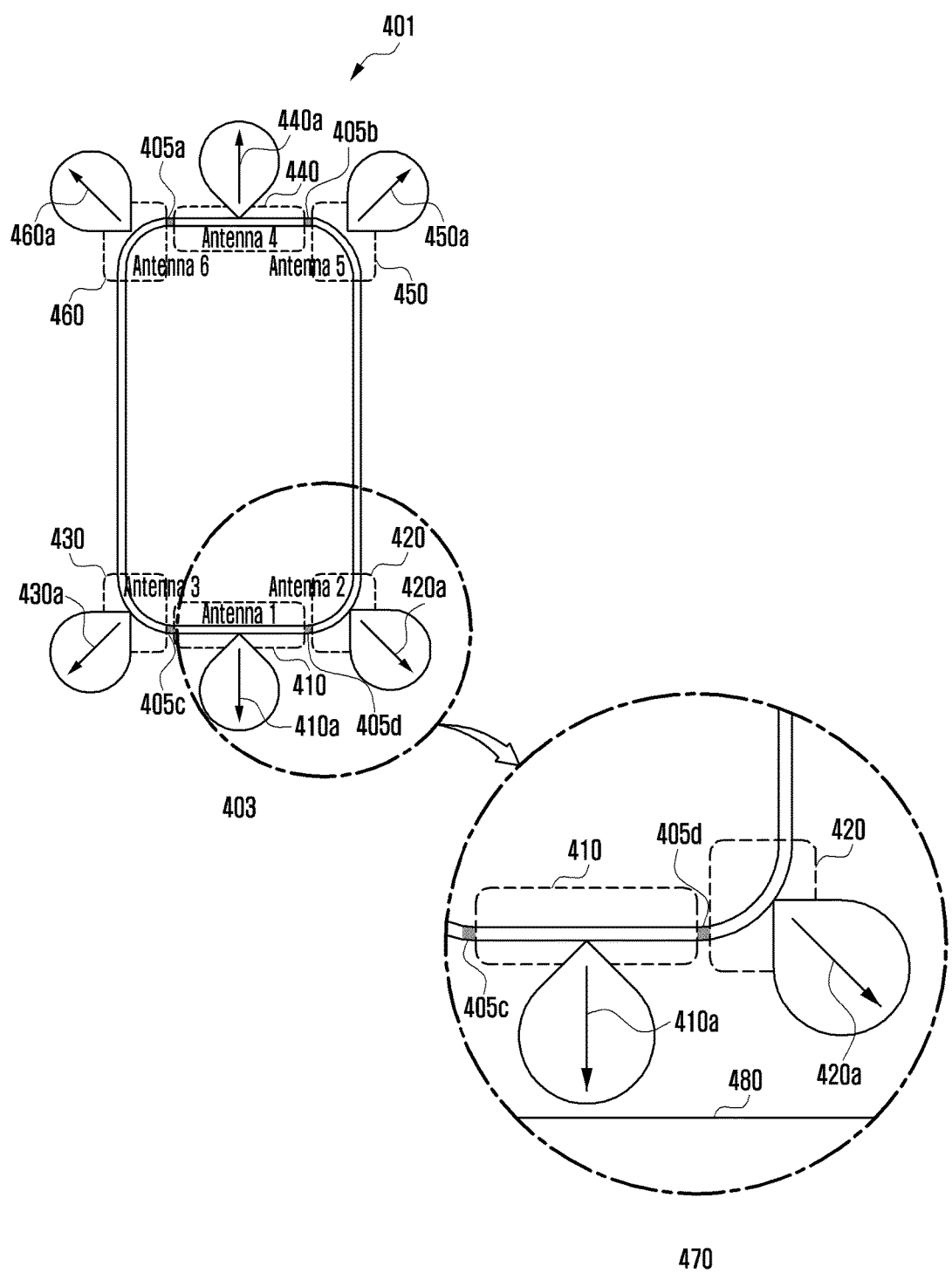
FIGS. 4A and 4B illustrate an electronic device according to an embodiment of the present disclosure.
Figure 4B:
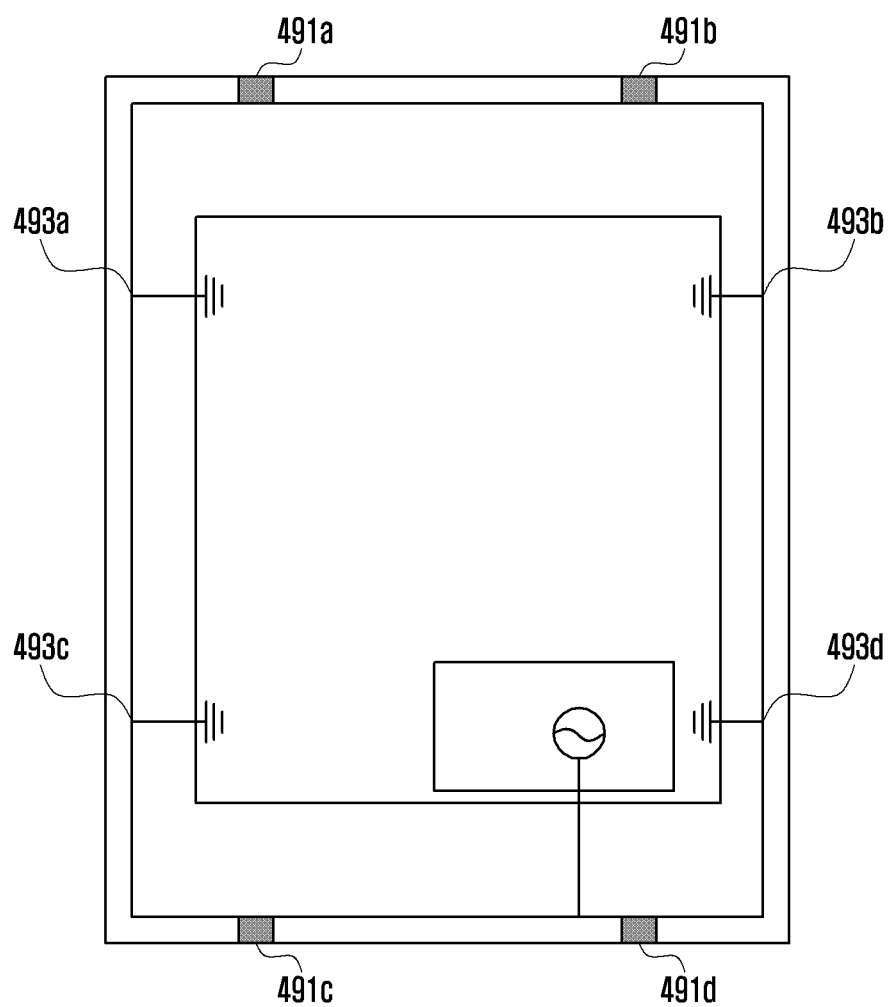

FIGS. 4A and 4B are diagrams illustrating an electronic device according to an embodiment of the present disclosure.

With reference to FIG. 4A, as shown in 403, an electronic device 401 may have a plurality of antennas, for example a first antenna 410 to a sixth antenna 460. The first antenna 410 of the plurality of antennas may be provided in a lower area of the electronic device 401, the second antenna 420 may be provided in a lower corner area of the right side of the electronic device 401, the third antenna 430 may be provided in a lower corner area of the left side of the electronic device 401, the fourth antenna 440 may be provided in an upper area of the electronic device 401, the fifth antenna 450 may be provided in an upper corner area of the right side of the electronic device 401, and the sixth antenna 460 may be provided in an upper corner area of the left side of the electronic device 401. The first antenna 410 to the sixth antenna 460 may transmit and receive a wireless signal of the same frequency band or different frequency bands.

The electronic device 401 may have segment portions between antennas. When an outer material of the electronic device 401 is made of metal, if interference occurs upon transmitting and receiving a wireless signal, the quality of the wireless signal may be deteriorated. In order to prevent the quality of the wireless signal from deteriorating, the electronic device 401 may have segment portions.

As illustrated in 403 of FIG. 4A, the electronic device 401 has four segment portions 405a, 405b, 405c, and 405d, and six antennas 410, 420, 430, 440, 450, and 460 may be separated by the four segment portions 405a, 405b, 405c, and 405d.

Although FIG. 4A illustrates that the electronic device 401 has 6 antennas, the present disclosure is not limited thereto and additional antennas may be provided.

In the electronic device 401, positions of antennas that transmit and receive a wireless signal of the same frequency band among the first antenna 410 to the sixth antenna 460 are different, but efficiency and performance thereof may be the same.

The first antenna 410 to the sixth antenna 460 may have different main lobe (gain pattern) directions. For example, a main lobe of the first antenna 410 may be in a lower direction 410a, a main lobe of the second antenna 420 may be in a lower corner direction 420a of the right side, a main lobe of the third antenna 430 may be in a lower corner direction 430a of the left side, a main lobe of the fourth antenna 440 may be in an upper direction 440a, a main lobe of the fifth antenna 450 may be in an upper corner direction 450a of the right side, and a main lobe of the sixth antenna 460 may be in an upper corner direction 460a of the left side.

SARs of the first antenna 410 to the sixth antenna 460 may be different according to an area, position, and direction in which an external object (e.g., a user's finger) contacts the first antenna 410 to the sixth antenna 460.

At a SAR measurement position, an angle of a normal vector direction may be different, and the SAR may be different according to a main lobe direction of the antenna. For example, at a SAR measurement position, when peak power is formed by the main lobe of the antenna in a normal vector direction, a SAR of the main lobe formed at an angle of 90° and a SAR of a main lobe formed at an angle of 45° may be different. That is, a SAR of the main lobe formed at an angle of 45° may be smaller than that of the main lobe formed at an angle of 90°.

As illustrated in the expanded view 470, it is assumed that SARs of the first antenna 410 and the second antenna 420 are measured at a low portion 480. When measuring the SAR at the low portion 480, a SAR of the first antenna 410 in which the main lobe is in the lower direction 410a (e.g., the main lobe formed at an angle of 90°) is directly measured at the low portion 480 and may be, for example 2 mW/g (milliwatts per gram), but a SAR of the second antenna 420 in which the main lobe is in a right corner direction 420a (e.g., the main lobe formed at an angle of 45°) is not directly measured at the low portion 480; therefore, a SAR of the second antenna 420 may be, for example 1.4 mW/g, which is a value lower than 2 mW/g. When switching the first antenna 410 and the second antenna 420 for a predetermined time, for example 0.5 seconds, a SAR may be [(2*0.5t)+(1.4*0.5t)]/t=1.7.

When switching the first antenna 410 and the second antenna 420 for a predetermined time, a numerical value of a SAR is an example and the present disclosure is not limited thereto.

It is assumed that a SAR is measured at an interval of 1 second, and when switching a plurality of antennas for 0.5 seconds, by switching a plurality of antennas for a time shorter than a SAR measurement time, a SAR reduction effect may be obtained.

A SAR according to connection of the communication unit and the first antenna 410 and the second antenna 420 and switching of the first antenna 410 and the second antenna 420 of the same frequency band at a predetermined time interval may be lower than a SAR according to connection of the communication unit and the first antenna 410. That is, an operation of transmitting and receiving a wireless signal by switching a plurality of antennas of the same frequency band based on a predetermined schedule may be effective in reducing a SAR, compared with an operation of transmitting and receiving a wireless signal through an antenna of a plurality of antennas of the same frequency band.

It is assumed that the electronic device 401 has a configuration having segment portions between antennas; however, the present disclosure is not limited thereto. As illustrated in FIG. 4B, a metal frame may have feeding points 491a, 491b, 491c, and 491d, and the feeding points may be separated by grounds (GNDs) 493a, 493b, 493c, and 493d.

Figure 5A:
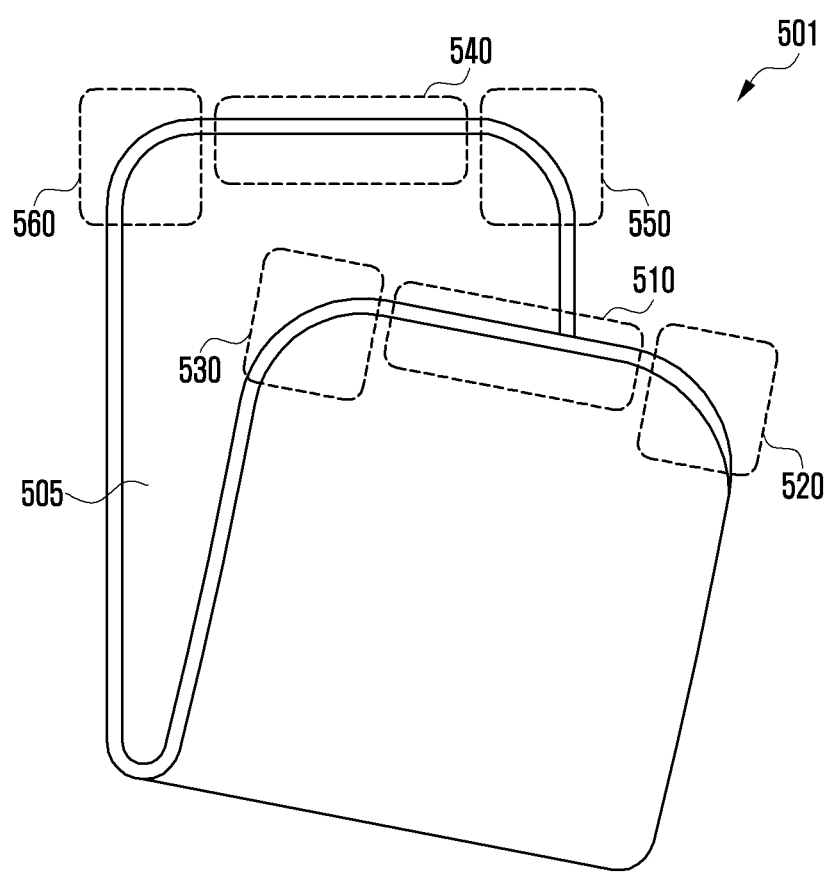
FIGS. 5A and 5B illustrate an electronic device according to another embodiment of the present disclosure.
Figure 5B:
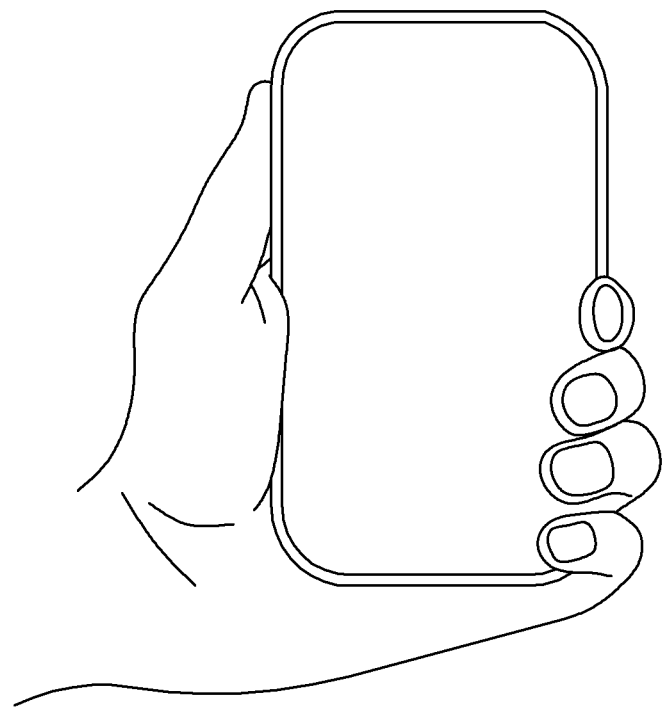

FIGS. 5A and 5B are diagrams illustrating an electronic device according to an embodiment of the present disclosure.

With reference to FIG. 5A, in an embodiment of the present disclosure, an electronic device 501 may be a flexible device.

In an embodiment of the present disclosure, because the electronic device 501 is a flexible device, the electronic device 501 may be bent, as shown in FIG. 5A. As shown in FIG. 5A, when the electronic device 501 is bent, a sensor (e.g., a proximity sensor, an illumination sensor) may detect that a first antenna 510 and a third antenna 530 approach a touch screen 505. In the electronic device 501, the sensor may be provided at a position in which the first antenna 510 to a sixth antenna 560 are provided.

When the electronic device 501 is bent such that the first antenna 510 to the third antenna 530 contacts the fourth antenna 540 to the sixth antenna 560, respectively, the electronic device 501 may detect that the first antenna 510 to the third antenna 530 contacts the fourth antenna 540 to the sixth antenna 560, respectively through a sensor (e.g., a proximity sensor, an illumination sensor). In the electronic device 501, the sensor may be provided at a position in which the first antenna 510 and the sixth antenna 560 are provided. The sensors provided in the each antenna may detect a bending signal of the electronic device 501.

In FIG. 5A, it is assumed that antennas that transmit and receive a wireless signal of the same frequency band among a plurality of antennas are the first antenna 510, the third antenna 530, the fifth antenna 550, and the sixth antenna 560.

The electronic device 501 may control connection of the first antenna 510, the third antenna 530, the fifth antenna 550, and the sixth antenna 560 to the communication unit at a predetermined schedule (e.g., sequentially switching the first antenna 510, the third antenna 530, the fifth antenna 550, and the sixth antenna 560 at the same rate for a predetermined time).

As illustrated in FIG. 5A, the electronic device 501 may detect through a sensor that the electronic device 501 is bent. When the electronic device 501 is bent, the first antenna 510 and the third antenna 530 of the plurality of antennas approach the touch screen 505; thus, the receive signal strength of the first antenna 510 and the third antenna 530 may reduce. That is, a performance of the first antenna 510 and the third antenna 530 may reduce as a result of the bending.

When the first antenna 510 and the third antenna 530 approach the touch screen 505, in order to prevent a performance thereof from reducing, the electronic device 501 may switch to only other antennas, e.g., the fifth antenna 550 and the sixth antenna 560, that transmit and receive a wireless signal of the same frequency band, and not the first antenna 510 and the third antenna 530, to control a connection to the communication unit.

The electronic device 501 switches only other antennas, e.g., the fifth antenna 550 and the sixth antenna 560, that transmit and receive a wireless signal of the same frequency band, and not the first antenna 510 and the third antenna 530, to control a connection to the communication unit. For a specific time, the electronic device 501 may adjust a time for switching the first antenna 510, the third antenna 530, the fifth antenna 550, and the sixth antenna 560.

For example, the first antenna 510, the third antenna 530, the fifth antenna 550, and the sixth antenna 560 are switched at a rate of 1:1:1:1 respectively for 4 seconds. When the electronic device 501 is bent, if the first antenna 510 and the third antenna 530 of the plurality of antennas approach the touch screen, the electronic device 501 may adjust a time to switch the first antenna 510, the third antenna 530, the fifth antenna 550, and the sixth antenna 560 at a rate of 0.4:0.4:1.6:1.6 respectively for 4 seconds. The electronic device 501 may control the switch unit to switch the first antenna 510, the third antenna 530, the fifth antenna 550, and the sixth antenna 560 based on the adjusted time for 4 seconds.

By switching antennas through adjusting a time that a wireless signal is transmitted and received using at least one antenna in which a receive signal strength is reduced to be shorter than a time that a wireless signal is transmitted and received using at least one antenna in which a receive signal strength is not reduced, while a SAR condition is satisfied, an antenna performance may be enhanced.

A user may hold the electronic device. The electronic device may include a grip sensor, and the grip sensor may detect proximity or contact by a gripping action of holding or grasping the electronic device with an external object (e.g., a user's finger). The grip sensor may be disposed in at least one area of left and right side portions, upper and lower side portions, and a rear portion of the electronic device.

Referring to FIG. 5B, the electronic device may detect proximity or contact by a gripping action of holding or gripping the electronic device through the grip sensor. The grip sensor may detect proximity or contact by the grip action in a lower area of the electronic device. In the electronic device, a receive signal strength of an antenna provided in the lower area may be reduced by the proximity or contact.

The electronic device may switch antennas, except for at least one antenna (e.g., an antenna provided in a lower area) whose receive signal strength is reduced to control a connection to the communication unit.

The grip sensor may detect proximity or contact by a gripping action in a lower area of the electronic device. In the electronic device, a power value (e.g., total radiated power (TRP)) of the antenna provided in the lower area may reduce due to the proximity or contact.

The electronic device may switch antennas, except for at least one antenna (e.g., an antenna provided in a lower area) whose power value is reduced to control a connection to the communication unit.

Figure 6:
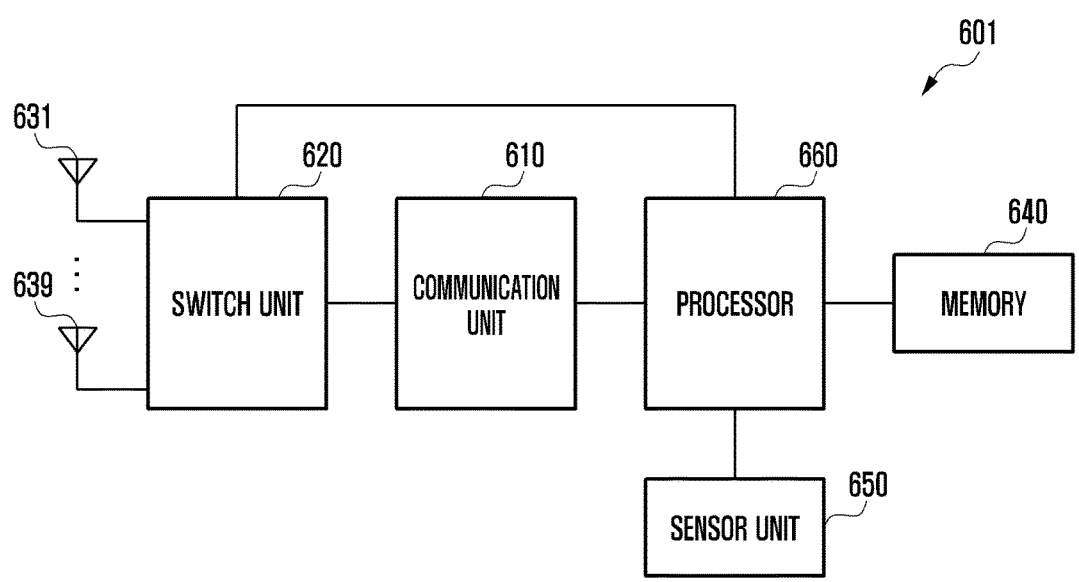
FIG. 6 illustrates an electronic device according to another embodiment of the present disclosure.

FIG. 6 illustrates an electronic device according to an embodiment of the present disclosure.

Referring to FIG. 6, an electronic device 601 includes a communication unit 610, switch unit 620, a memory 640, a sensor unit 650, and a processor 660.

The communication unit 610 may perform communication between the electronic device 601 and an external electronic device. The communication unit 610 may be connected to a network through wireless communication or wired communication to communicate with the external electronic device. The wireless communication may include wireless fidelity (Wi-Fi), Bluetooth™ (BT), and near field communication (NFC). Further, the wireless communication may include cellular communication (e.g., LTE, LTE-A, CDMA, WCDMA, UMTS, WIBRO, GSM, circuit switched data (CSD), cellular digital packet data (CDPD), integrated digital enhanced network (iDEN), or personal digital cellular telecommunication system (PDC)).

The wired communication may include at least one of USB, HDMI, RS-232, and POTS.

The communication unit 610 may be connected to at least one antenna of a plurality of antennas 631 to 639 through the switch unit 620. The communication unit 610 may be connected to at least one antenna corresponding to a frequency band among the plurality of antennas 631 to 639 by the switch unit 620.

The main lobes of each of the plurality of antennas 631 to 639 may be different.

A plurality of switch units may exist on a frequency band basis. The switch unit 620 may switch to at least one antenna corresponding to a frequency band of the communication unit 610 among the antennas 631 to 639. When a plurality of antennas corresponding to the communication unit 610 exist, the switch unit 620 may switch a plurality of antennas corresponding to the communication unit 610 at a predetermined time interval. The plurality of antennas 631 to 639 may include a mobile communication antenna (e.g., LTE communication antenna, 3G communication antenna), wireless communication antenna (e.g., Wi-Fi antenna for wireless LAN communication, Bluetooth™ antenna for short range wireless communication, and Zigbee antenna), NFC antenna, broadcasting communication antenna (e.g., terrestrial DMB antenna), GPS antenna, and wireless battery charging antenna.

The memory 640 may have a program memory that stores an operation program of the electronic device 601 and a data memory that stores data such as log information, content, and an object occurring while executing a program.

The memory 640 may store a switch control program that controls the switch unit 620, may store a program to schedule switching a plurality of antennas by controlling the switch unit 620, may store a reference value for determining whether a receive signal strength of at least one antenna of a plurality of antennas reduces to a predetermined value, and may store a receive signal strength reference value to be a reference for adjusting a switching time of at least one antenna having a reduced receive signal strength among a plurality of antennas. The memory 640 may also store a power reference value to be a reference for adjusting a switching time of at least one antenna having a reduced power value among a plurality of antennas.

The sensor unit 650 may measure a physical quantity or detect an operation state of the electronic device 601 to convert measured or detected information to an electric signal.

The sensor unit 650 may include a grip sensor and a proximity sensor. The proximity sensor may detect an object approaching the electronic device 601, for example an approach of an external object (e.g., a user finger or a stylus) to a display of the electronic device 601.

The grip sensor may detect a contact by a gripping action of holding or grasping the electronic device 601 through the external object (e.g., a user's finger). The grip sensor may be disposed in at least one area of left and right side portions, upper and lower side portions, and a rear portion of the electronic device 601. The grip sensor may transfer detected sensor information (e.g., a position value of detection of an external object by the electronic device 601 and a magnitude of a sensor value) to the processor 660.

The proximity sensor may be provided at a position in which the first antenna to the sixth antenna (e.g., 510 to 560 of FIG. 5A) of the electronic device 601 are provided. The sensors provided in each antenna may detect a bending signal of the electronic device 601.

The processor 660 may control the switch unit 620 to switch a plurality of antennas based on a predetermined schedule. The plurality of antennas each may have different main lobes. The predetermined schedule may be to sequentially switch the plurality of antennas 631 to 639 at the same time interval (e.g., 0.1 second) for a specific time (e.g., 1 second).

The processor 660 may determine whether a receive signal strength of at least one antenna of the plurality of antennas is less than or equal to a reference value. When receiving sensor information (e.g., a position of the electronic device 601 to which an external object approaches and a magnitude of a sensor value) through the sensor unit 650, the processor 660 may use the sensor information to determine an antenna corresponding to sensor information among the plurality of antennas. The processor 660 may determine a position of the electronic device 601 to which an external object approaches using the sensor information and compare the determined position and a position of the antenna provided in the electronic device 601 to determine an antenna corresponding to the sensor information. The processor 660 may measure a receive signal strength of the antenna corresponding to the sensor information.

When a receive signal strength of the antenna corresponding to the measured sensor information is less than or equal to a reference value, the processor 660 may switch at least one antenna having a receive signal strength that is less than or equal to the reference value to the remaining antennas.

The processor 660 may adjust a receive signal strength of the antenna corresponding to the measured sensor information at a predetermined schedule based on a predetermined receive signal strength reference value. The receive signal strength reference value may be configured with a plurality of levels divided into a predetermined range.

The processor 660 may determine a value corresponding to the measured receive signal strength of the antenna in a receive signal strength reference value configured with the plurality of levels, adjust a time of using at least one antenna having a reduced receive signal strength is shorter than a time of using at least one antenna in which receive signal strength is not reduced based on the determined value, and control the switch unit 620 to switch the plurality of antennas based on the adjusted schedule.

The processor 660 may switch a plurality of antennas based on a predetermined schedule and measure a power value of the plurality of antennas. When the processor 660 detects that a power value of at least one antenna is reduced based on the measured plurality of antenna power values, the processor 660 may determine at least one antenna having a reduced power value. The processor 660 may determine a power reference value corresponding to the reduced at least one antenna power value, adjust a schedule such that a time of using at least one antenna having a reduced power value is shorter than a time of using at least one antenna whose power value is not reduced based on the determined power reference value, and control the switch unit 620 to switch the plurality of antennas based on the adjusted schedule.

The electronic device may further include elements having an additional function such as a GPS module for receiving position information, an audio processor having a microphone and a speaker, a broadcast receiving module for receiving broadcasts, and an input unit for an input based on a hard key, but a detailed description thereof will be omitted.

Figure 7:
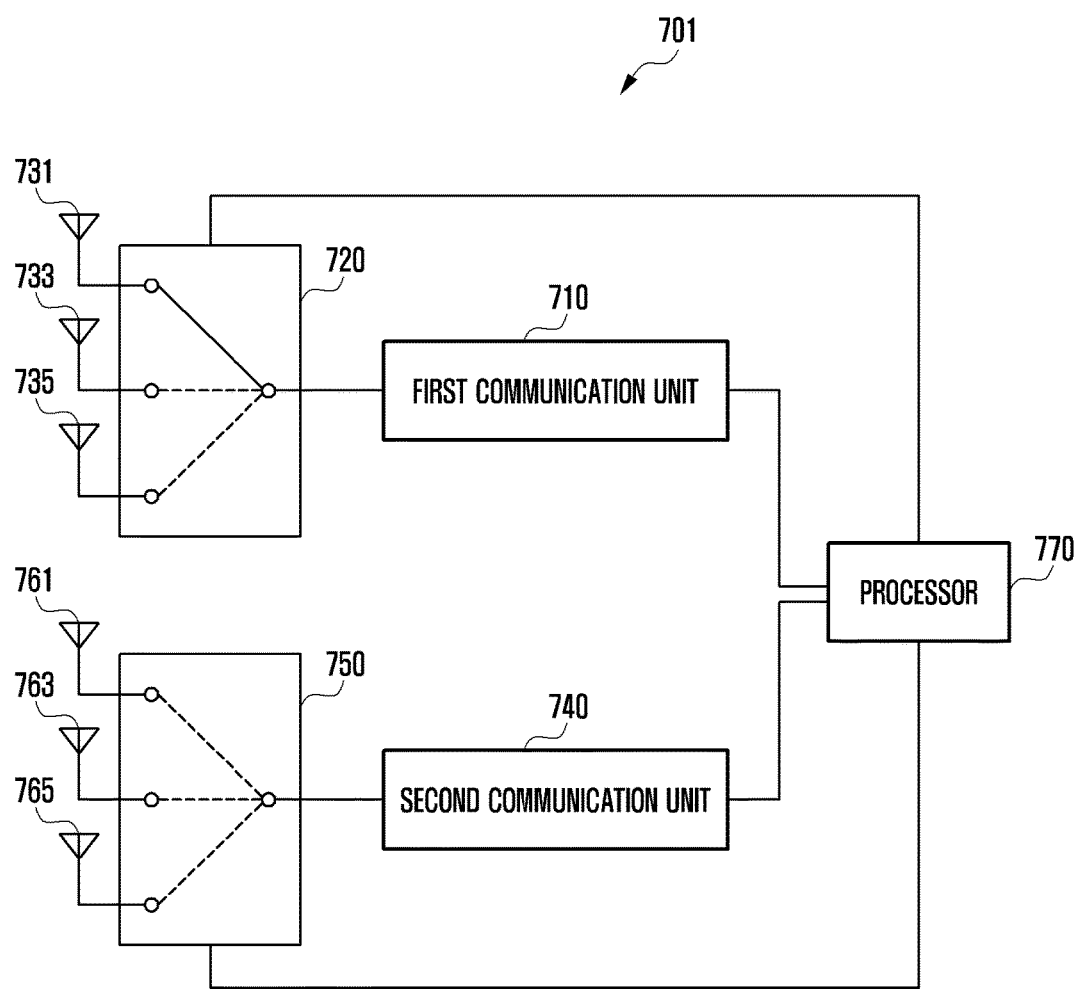
FIG. 7 illustrates an electronic device according to another embodiment of the present disclosure.

FIG. 7 illustrates an electronic device according to an embodiment of the present disclosure.

Referring to FIG. 7, in an embodiment of the present disclosure, an electronic device 701 includes a first communication unit 710, a first switch unit 720, a first antenna 731 to third antenna 735, a second communication unit 740, a second switch unit 750, a fourth antenna 761 to sixth antenna 765, and a processor 770.

The first antenna 731 to the third antenna 735 may transmit and receive a wireless signal of a frequency band different from that of the fourth antenna 761 to the sixth antenna 765. The first antenna 731 to the third antenna 735 may transmit and receive a wireless signal of a first frequency band, and the fourth antenna 761 to the sixth antenna 765 may transmit and receive a wireless signal of a second frequency band. The first antenna 731 to the third antenna 735 may be electrically connected to the first communication unit 710 or may be separated from the first communication unit 710 by the first switch unit 720. The fourth antenna 761 to the sixth antenna 765 may be electrically connected to the second communication unit 740 or may be separated from the second communication unit 740 by the second switch unit 750.

In order to connect to the first communication unit 710, the processor 770 may control the first switch unit 720 to switch the first antenna 731 to the third antenna 735 based on a predetermined schedule (e.g., sequentially switching the first antenna 731 to the third antenna 735 at a predetermined time interval (e.g., 1 second) for a specific time (e.g., 3 seconds)).

In order to connect to the second communication unit 740, the processor 770 may control the second switch unit 750 to switch the fourth antenna 761 to the sixth antenna 765 based on a predetermined schedule (e.g., sequentially switching the fourth antenna 761 to the sixth antenna 765 at a predetermined time interval (e.g., 1 second) for a specific time (e.g., 3 seconds)).

As described with reference to FIG. 6, when a receive signal strength of at least one antenna among the first antenna 731 to the third antenna 735 (or the fourth antenna 761 to the sixth antenna 765) for connecting the first communication unit 710 (or the second communication unit 740) reduces to be less than or equal to a reference value, the processor 770 may control the first switch unit 720 (or the second switch unit 750) to switch to the remaining antennas and not to the at least one antenna having a receive signal strength that is less than or equal to the reference value.

In order to transmit and receive a wireless signal of a first frequency band, the first switch unit 720 may switch the first antenna 731 to the third antenna 735 to connect to the first communication unit 710 at a predetermined time interval for a specific time. When it is determined that a receive signal strength of the second antenna 733 among the first antenna 731 to the third antenna 735 is less than or equal to a reference value, the electronic device 701 may switch and connect the first antenna 731 and the third antenna 735, and not the second antenna 733 at a predetermined time interval for a specific time.

The processor 770 may adjust a time using at least one antenna having a reduced receive signal strength and a time using an antenna in which a receive signal strength is not reduced. The electronic device 701 may adjust a time that transmits and receives a wireless signal switched to the first antenna 731 or the third antenna 735, to be longer than a time that transmits and receives a wireless signal switched to the second antenna 733.

When a receive signal strength reduces, a switching schedule of a plurality of antennas is adjusted; however, the present disclosure is not limited thereto, and the electronic device 701 may adjust a switching schedule of the plurality of antennas based on a power value of a plurality of antennas. When the processor 770 detects that a power value of at least one antenna is reduced based on a measured plurality of antenna power values, the processor 770 may determine at least one antenna having a reduced power value. The processor 770 may adjust a schedule such that a time using at least one antenna having a reduced power value is shorter than a time using at least one antenna whose power value is not reduced based on a power reference value corresponding to the reduced at least one antenna power value. Accordingly, by switching antennas through adjusting a time that a wireless signal is transmitted and received using at least one antenna in which a power value is reduced to be shorter than a time a wireless signal is transmitted and received using at least one antenna in which a power value is not reduced, while a SAR condition is satisfied, an antenna performance may be enhanced.

In order to transmit and receive a wireless signal of a first frequency band, the first switch unit 720 may switch the first antenna 731 to the third antenna 735 and connect the first communication unit 710 at a predetermined time interval for a specific time. If a power value of the second antenna 733 among the first antenna 731 to the third antenna 735 reduces, the electronic device 701 may switch to the first antenna 731 and the third antenna 735, and not to the second antenna 733 whose power value is reduced at a predetermined time interval for a specific time.

Alternatively, the electronic device 701 may adjust a time that the first antenna 731 or the third antenna 735 transmits and receives a wireless signal to be longer than a time that the second antenna 733, whose power value is reduced, transmits and receives a wireless signal.

Figure 8:
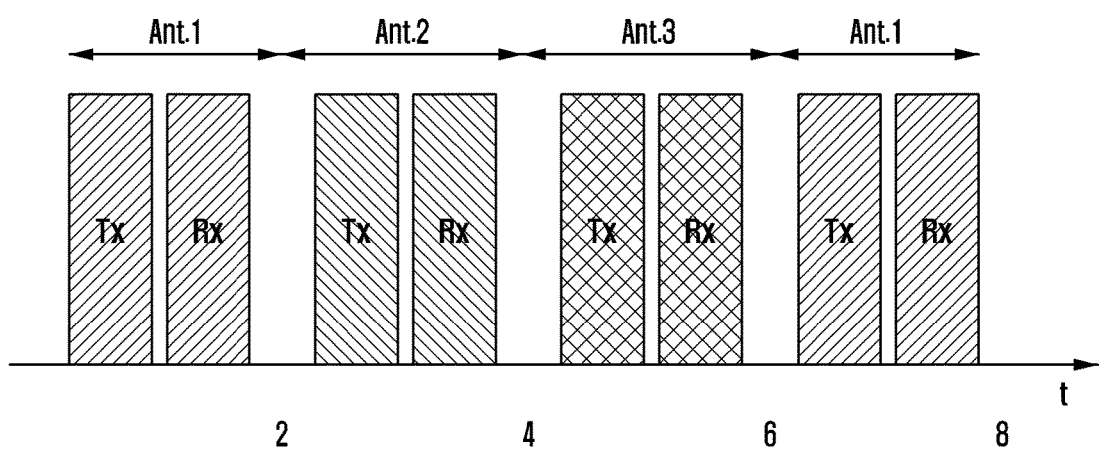
FIGS. 8 to 10 illustrate a method of switching an antenna for SAR reduction according to an embodiment of the present disclosure.
Figure 9:
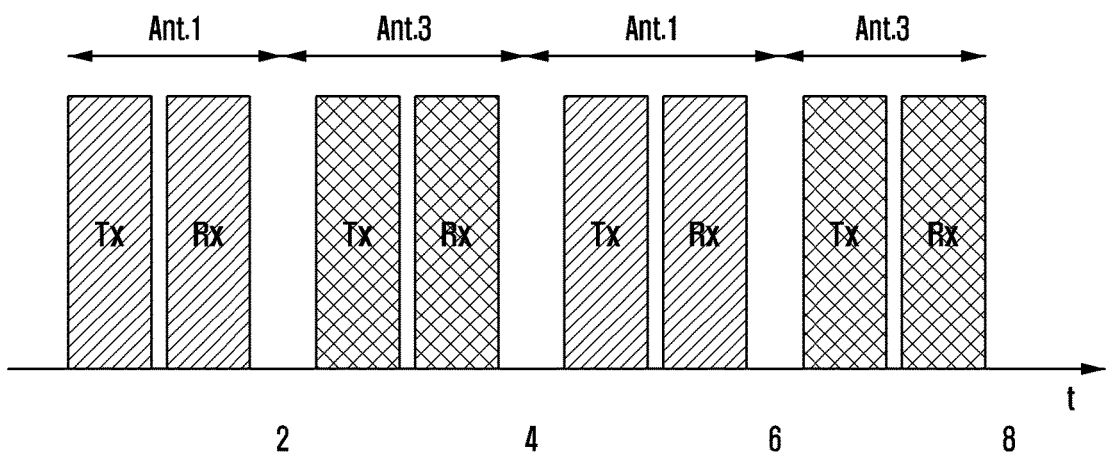
Figure 10:
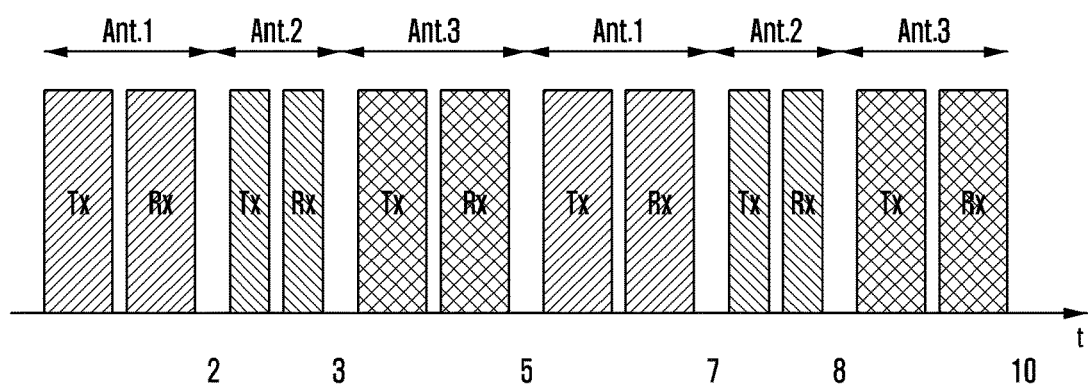

FIGS. 8 to 10 are diagrams illustrating a method of switching an antenna for SAR reduction according to an embodiment of the present disclosure.

The electronic device may control the switch unit to connect the communication unit and an antenna corresponding to the communication unit among a plurality of antennas based on a predetermined schedule.

The electronic device may control the switch unit to switch the first antenna to the third to the communication unit based on a predetermined schedule (e.g., an interval of 2 seconds), for example a first schedule.

In FIG. 8, it is assumed that the first antenna to the third antenna are switched at an interval of 2 seconds for 6 seconds.

Referring to FIG. 8, the electronic device may control the switch unit to connect the communication unit and the first antenna. After being connected to the first antenna, when 2 seconds have elapsed, the electronic device may control the switch unit to switch from the first antenna to the second antenna in order to connect the communication unit and the second antenna. After being switched to the second antenna, when 2 seconds have elapsed (i.e., 4 seconds total elapsed time), the electronic device may control the switch unit to switch from the second antenna to the third antenna in order to connect the communication unit and the third antenna. After being switched to the third antenna, when 2 seconds have elapsed (i.e., 6 seconds total elapsed time), the electronic device may control the switch unit to switch from the third antenna to the first antenna in order to connect the communication unit and the first antenna.

The electronic device may control the switch unit to receive sensor information through the sensor unit while switching the first antenna to the third antenna based on the predetermined schedule (e.g., sequentially switching the first antenna to the third antenna at an interval of 2 seconds for 6 seconds). The sensor information may include a detection of an external object by the electronic device and a magnitude of a sensor value of detection of the external object. The electronic device may determine whether a receive signal strength of at least one antenna of the first antenna to the third antenna is reduced based on the received sensor information.

A receive signal strength of the at least one antenna may be reduced. When the reduced receive signal strength is less than or equal to a reference value, the electronic device may generate a second schedule based on the remaining antennas, and not on at least one antenna having a reduced receive signal strength that is less than or equal to a reference value. Thereafter, the electronic device may switch the remaining antennas based on a second schedule.

When a receive signal strength of the at least one antenna reduces, the electronic device may generate a second schedule in which a first schedule is adjusted. The electronic device may generate a second schedule in which a time using at least one antenna having a reduced receive signal strength among the first antenna to the third antenna is adjusted to be shorter than a predetermined time interval. The electronic device may switch the first antenna to the third antenna based on the second schedule.

When it is assumed that at least one antenna having a receive signal strength less than or equal to a reference value is a second antenna, the electronic device may generate a schedule based on the first antenna and the third antenna, and not the second antenna having a receive signal strength that is less than or equal to the reference value. The electronic device may switch the first antenna and the third antenna based on the second schedule.

When a received signal code power (RSCP) of the first antenna to the third antenna is −95 dBm or more, the electronic device may switch the first antenna to the third antenna according to a first schedule. Alternatively, when the RSCP of the first antenna to the third antenna is less than −95 dBm, the electronic device may generate a second schedule for switching based on an antenna having a good performance (e.g., antenna having a high RSCP) among the first antenna to the third antenna.

In FIG. 8, while switching the first antenna to the third antenna at an interval of 2 seconds for 6 seconds, when a receive signal strength of the second antenna reduces to be less than or equal to a reference value, the electronic device may switch the first antenna and the third antenna, and not the second antenna, at an interval of 2 seconds.

Referring to FIG. 9, the electronic device may control the switch unit to connect the communication unit and the first antenna. After the communication unit and the first antenna are connected, when 2 seconds have elapsed, the electronic device may control the switch unit to switch from the first antenna to the third antenna in order to connect the communication unit and the third antenna. After being switched to the third antenna, when 2 seconds have elapsed (i.e., 4 seconds total elapsed time), the electronic device may control the switch unit to switch from the third antenna to the first antenna in order to connect the communication unit and the first antenna. After being switched to the first antenna, when 2 seconds have elapsed (i.e., 6 seconds total elapsed time), the electronic device may control the switch unit to switch from the first antenna to the third antenna in order to connect the communication unit and the third antenna.

The electronic device may reduce a SAR through a switching operation of sequentially transmitting a wireless signal using a plurality of antennas having different main emission directions and transmit and receive a wireless signal with only antennas having a receive signal strength exceeding a reference value, and not antennas having a receive signal strength that is less than or equal to a reference value, thereby providing increased antenna performance.

When a receive signal strength of the second antenna changes from being less than or equal to a reference value to being greater than the reference value, the electronic device may control the switch unit to switch the first antenna to the third antenna based on a first schedule as illustrated in FIG. 8.

Although the present disclosure includes an example in which an antenna having a receive signal strength that is less than or equal to a reference value is a second antenna, the present disclosure is not limited thereto. For example, when a receive signal strength of the third antenna is also less than or equal to a reference value, the electronic device may control a connection to the communication unit with only a first antenna to transmit and receive a wireless signal.

Referring to FIG. 10, an antenna having a reduced receive signal strength is a second antenna.

The electronic device may determine a value of a receive signal strength of the second antenna and compare it to a predetermined receive signal strength reference value. The electronic device may adjust a time using an antenna in which a receive signal strength is not reduced to be longer than a time using at least one antenna in which a receive signal strength is reduced based on the determined value. That is, the electronic device may adjust a predetermined schedule based on the receive signal strength reference value and control the switch unit to switch the first antenna to the third antennas in order to connect to the communication unit according to the adjusted schedule.

Referring to Table 1 below, when a receive signal strength of the second antenna is in a range of −95 dBm to −100 dBm, the electronic device may determine the receive signal strength to be at a first level and adjust a time that a wireless signal is transmitted and received using the second antenna to be reduced by 0.5 seconds (from 2 seconds to 1.5 seconds), according to a predetermined schedule. When a receive signal strength of the second antenna is in a range of −100 dBm to −105 dBm, the electronic device may determine the receive signal strength to be at a second level and adjust a time that a wireless signal is transmitted and received using the second antenna by 0.7 seconds (from 2.0 to 1.3 seconds), according to a predetermined schedule. When a receive signal strength of the second antenna is in a range of −105 dBm to −108 dBm, the electronic device may determine the receive signal strength reference value to be a third level and adjust a time that a wireless signal is transmitted and received using the second antenna by 0.9 seconds (from 2.0 to 1.1 seconds), according to a predetermined schedule. The time adjusting values in Table 1 are an example and the present disclosure is not limited thereto.

TABLE 1

| Range of receive signal strength | Reference value of receive signal strength | Time adjusting value |
| --- | --- | --- |
| −95 dBm to −100 dBm | first level | reduce by 0.5 |
| −100 dBm to −105 dBm | second level | reduce by 0.7 |
| −105 dBm to −108 dBm | third level | reduce by 0.9 |

In FIG. 8, while switching the first antenna to the third antenna at an interval of 2 seconds for 6 seconds, when a receive signal strength of the second antenna reduces, a time that a wireless signal is transmitted and received using the second antenna may be adjusted with reference to Table 1.

As illustrated in FIG. 10, the electronic device may control the switch unit to connect the communication unit and the first antenna. After the communication unit and the first antenna are connected, when 2 seconds have elapsed, the electronic device may control the switch unit to switch from the first antenna to the second antenna in order to connect the communication unit and the second antenna. After being switched to the second antenna, when 1 second has elapsed (i.e., 3 seconds total elapsed time) according to the adjusted schedule, the electronic device may control the switch unit to switch from the second antenna to the third antenna in order to connect the communication unit and the third antenna. After being switched to the third antenna, when 2 seconds have elapsed (i.e., 5 seconds total elapsed time), the electronic device may control the switch unit to switch from the third antenna to the first antenna in order to connect the communication unit and the first antenna.

The electronic device may reduce a SAR and increase antenna performance through a switching operation of sequentially transmitting a wireless signal using a plurality of antennas having different main emission directions based on a schedule in which a time of using an antenna in which a receive signal strength is not reduced is adjusted to be longer than a time of using an antenna in which a receive signal strength is reduced.

Figure 11:
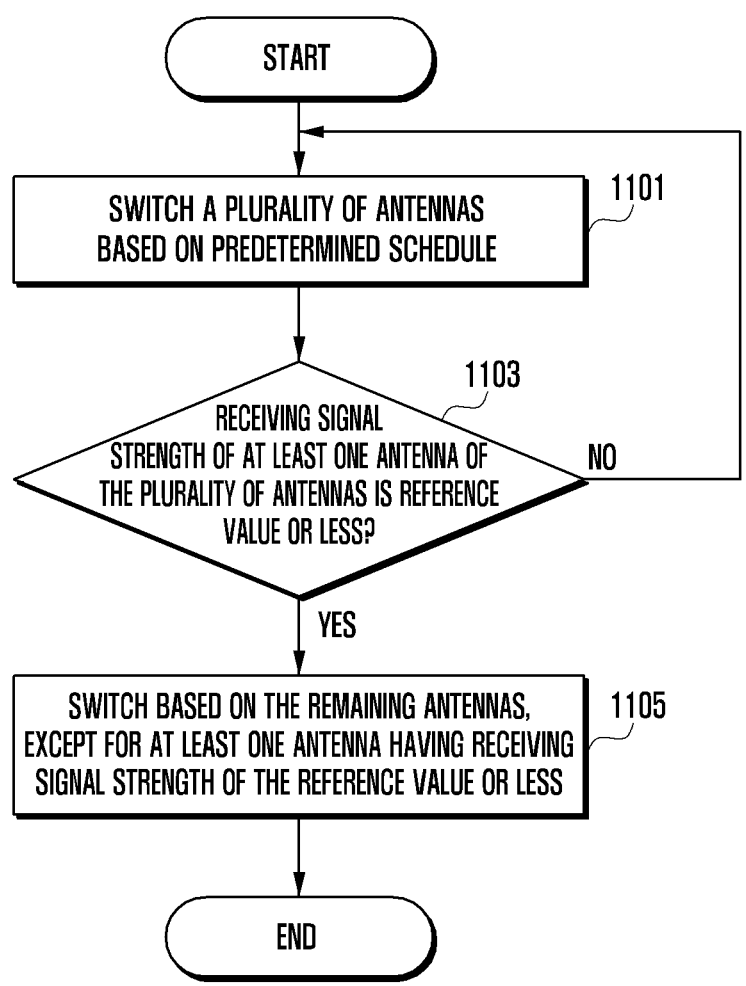
FIG. 11 is a flowchart illustrating a method of switching an antenna for SAR reduction according to an embodiment of the present disclosure.

FIG. 11 is a flowchart illustrating a method of switching an antenna for SAR reduction according to an embodiment of the present disclosure.

A plurality of antennas may transmit and receive a wireless signal of different frequency bands. Further, the plurality of antennas each may have different main emission directions.

Referring to FIG. 11, in step 1101, the electronic device controls the switch unit to switch a plurality of antennas corresponding to the same frequency band, e.g., a first frequency band, based on a predetermined schedule. The electronic device may switch the plurality of antennas to control a connection to a communication unit, e.g., a first communication unit corresponding to the first frequency band. The first schedule may be used for sequentially switching a plurality of antennas at a predetermined time interval for a specific time.

In step 1103, the electronic device determines whether a receive signal strength of at least one antenna of the plurality of antennas is less than or equal to a reference value.

When an input (e.g., an input in which an external object approaches or contacts at least one antenna, an input when gripping or charging the electronic device, and an input in which the external object approaches or contacts at least one antenna when the flexible electronic device is bent) in which an external object (e.g., user's finger) approaches or contacts at least one antenna provided in the electronic device is detected, a receive signal strength of the at least one antenna may reduce.

The electronic device may receive sensor information according to an operation of gripping the electronic device, sensor information according to bending of the flexible electronic device, and sensor information according to charging of the electronic device through the sensor unit. The sensor information may include a position value of an external object detected by the electronic device and a magnitude of a sensor value of the detected external object. When the sensor information is received, the electronic device may determine an antenna having a reduced receive signal strength among a plurality of antennas and measure a receive signal strength. The electronic device may determine whether the measured receive signal strength is less than or equal to a reference value.

If a receive signal strength of at least one antenna of the plurality of antennas is not less than or equal to a reference value in step 1103, the process returns to step 1101, wherein the electronic device may control the switch unit to switch a plurality of antennas corresponding to the same frequency band based on a first schedule.

However, if a receive signal strength of at least one antenna of the plurality of antennas is less than or equal to a reference value in step 1103, in step 1105, the electronic device switches the remaining antennas, but not the at least one antenna having the receive signal strength that is less than or equal to the reference value.

When at least one antenna having a receive signal strength that is less than or equal to a reference value subsequently has a receive signal strength exceeding the reference value, the electronic device may switch a plurality of antennas based on a first schedule.

Figure 12:
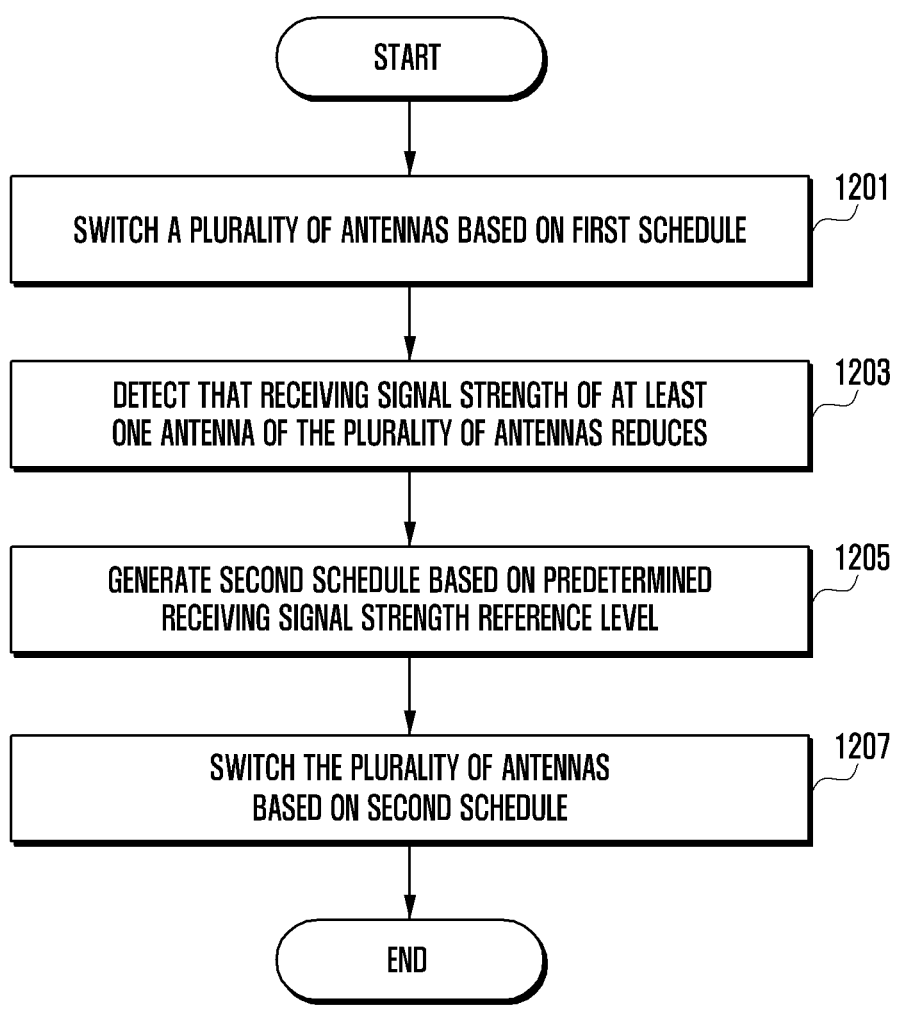
FIG. 12 is a flowchart illustrating a method of switching an antenna for SAR reduction according to another embodiment of the present disclosure.

FIG. 12 is a flowchart illustrating a method of switching an antenna for SAR reduction according to an embodiment of the present disclosure.

Referring to FIG. 12, in step 1201, the electronic device controls the switch unit to switch a plurality of antennas corresponding to the same frequency band, e.g., a first frequency band, based on a predetermined schedule, e.g., a first schedule. By switching the plurality of antennas, the electronic device may control a connection to a communication unit, e.g., a first communication unit corresponding to the first frequency band.

In step 1203, the electronic device detects that a receive signal strength of at least one antenna of the plurality of antennas is reduced.

When an input (e.g., an input in which an external object approaches or contacts at least one antenna, an input when gripping or charging the electronic device, and an input in which the external object approaches or contacts at least one antenna when the flexible electronic device is bent) in which the external object (e.g., user's finger) approaches or contacts at least one antenna provided in the electronic device is detected, a receive signal strength of the at least one antenna may reduce.

The electronic device may receive sensor information according to an operation of gripping the electronic device, sensor information according to bending of a flexible electronic device, and sensor information according to charging of the electronic device through the sensor unit. The sensor information may include a position value of an external object detected by the electronic device and a magnitude of a sensor value of the detected external object. When the sensor information is received, the electronic device may determine an antenna having a reduced receive signal strength among a plurality of antennas.

In step 1205, the electronic device generates a second schedule based on a predetermined receive signal strength reference value. The electronic device may determine a value corresponding to receive signal strength of the at least one antenna in the receive signal strength reference value with reference to Table 1. The electronic device may adjust a time that a wireless signal is transmitted and received using the at least one antenna and may use a time adjusting value according to the determined value.

In step 1207, the electronic device controls the switch unit to switch the plurality of antennas based on a second schedule.

Figure 13:
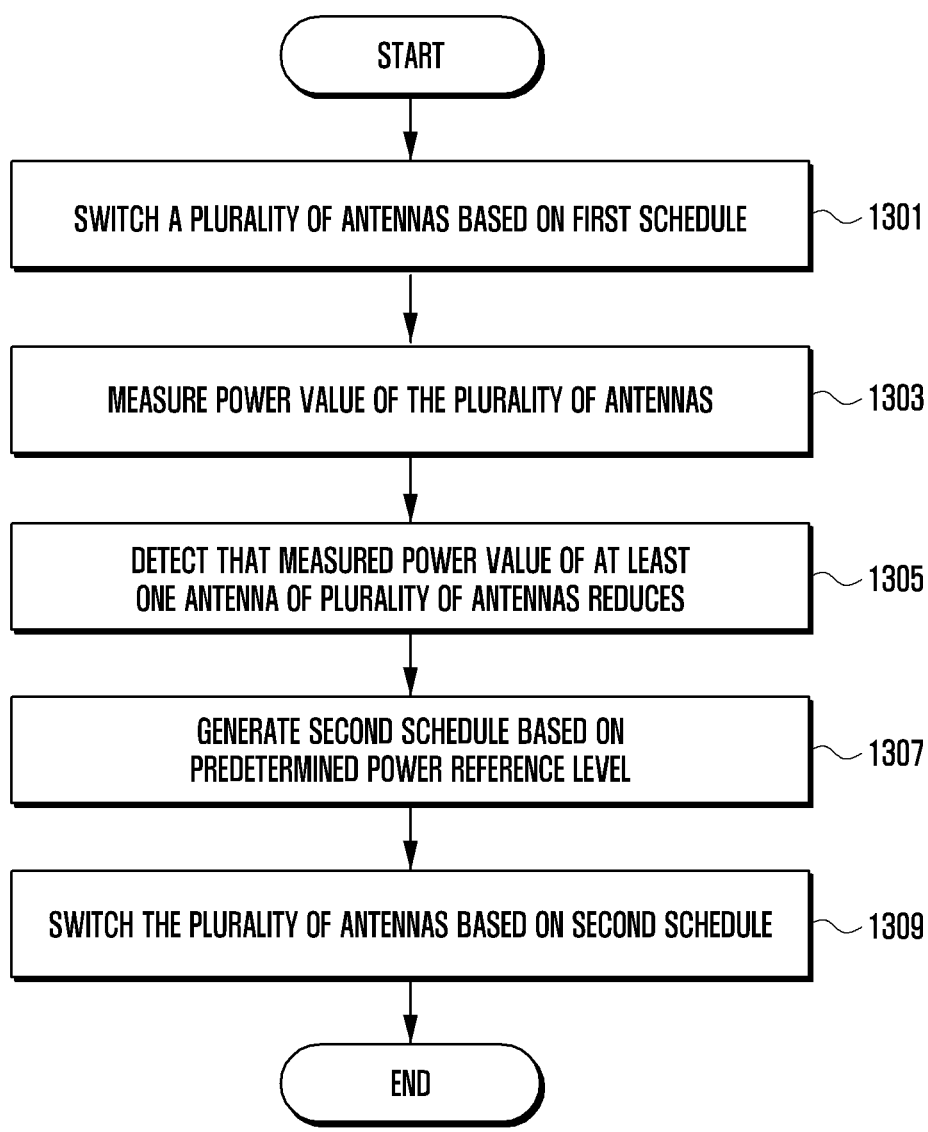
FIG. 13 is a flowchart illustrating a method of switching an antenna for SAR reduction according to another embodiment of the present disclosure.

FIG. 13 is a flowchart illustrating a method of switching an antenna for SAR reduction according to an embodiment of the present disclosure.

Referring to FIG. 13, in step 1301, the electronic device controls the switch unit to switch a plurality of antennas corresponding to the same frequency band, e.g., a first frequency band, based on a predetermined schedule, e.g., a first schedule.

In step 1303, the electronic device measures a power value of the plurality of antennas.

In step 1305, the electronic device detects that a power value of at least one antenna reduces based on the measured antenna power values. When an input in which an external object (e.g., a user's finger) approaches or contacts at least one antenna provided in the electronic device is detected, the power value of at least one antenna may reduce. When an input that approaches or contacts the at least one antenna of the plurality of antennas is detected, the electronic device may determine at least one antenna having a reduced power value.

In step 1307, the electronic device generates a second schedule based on a predetermined power reference value. The electronic device may determine a level of a power reference value corresponding to a power value range of the at least one antenna with reference to Table 2.

TABLE 2

| Power value range | Power reference value | Time adjusting value |
| --- | --- | --- |
| −95 dBm to −100 dBm | first level | reduce by 0.5 |
| −100 dBm to −105 dBm | second level | reduce by 0.7 |
| −105 dBm to −108 dBm | third level | reduce by 0.9 |

The electronic device may adjust a time that a wireless signal is transmitted and received using at least one antenna and may use a time adjusting value according to the determined power reference value.

In step 1309, the electronic device controls the switch unit to switch the plurality of antennas based on the second schedule.

Figure 14:
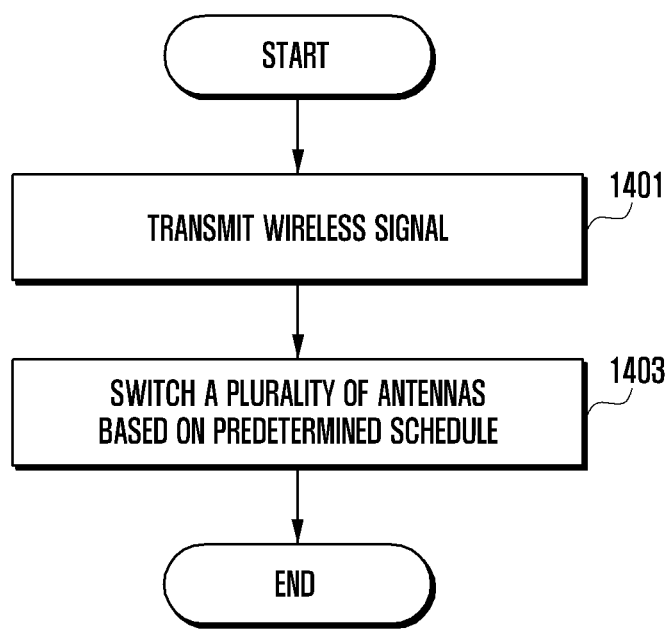
FIG. 14 is a flowchart illustrating a method of switching an antenna for SAR reduction according to another embodiment of the present disclosure.

FIG. 14 is a flowchart illustrating a method of switching an antenna for SAR reduction according to an embodiment of the present disclosure.

Referring to FIG. 14, in step 1401, the electronic device starts transmitting a wireless signal.

In step 1403, the electronic device switches a plurality of antennas based on a predetermined schedule. The predetermined schedule may be used for sequentially switching a plurality of antennas at a predetermined time interval for a specific time. The electronic device may switch the plurality of antennas at the predetermined schedule to transmit and receive a wireless signal.

In a method of switching an antenna for SAR reduction and an electronic device that supports the same according to an embodiment of the present disclosure, by switching a plurality of antennas having different main emission directions at a predetermined time interval for a predetermined time, a SAR may be reduced as compared with the case of using one antenna.

In a method of switching an antenna for SAR reduction and an electronic device that supports the same according to an embodiment of the present disclosure, by switching antennas to transmit and receive a wireless signal using an antenna having a high performance among a plurality of antennas, while satisfying a SAR reference value, communication performance may be increased.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
   a communication unit;
   a plurality of antennas;
   a switch unit that electrically connects the communication unit and the plurality of antennas; and
   a processor configured to control the switch unit at a predetermined schedule to sequentially switch the plurality of antennas at the same time interval for a specific time, in order to transmit a wireless signal through the plurality of antennas having different main emission directions.

2. The electronic device of claim 1, wherein the processor is further configured to control the switch unit not to switch at least one antenna having a receive signal strength reduced to be less than or equal to a reference value, and to sequentially switch remaining antenna except for the at least one antenna, among the plurality of antennas, based on the predetermined schedule, when the receive signal strength of the at least one antenna of the plurality of antennas is less than or equal to the reference value, while sequentially switching the plurality of antennas based on the predetermined schedule.

3. The electronic device of claim 2, further comprising a sensor unit,
wherein the processor is further configured to:
measure the receive signal strength of at least one antenna corresponding to sensor information received by the sensor unit among the plurality of antennas having different main emission directions, and
compare the measured receive signal strength and the reference value to determine whether the receive signal strength of the at least one antenna is less than or equal to the reference value.

4. The electronic device of claim 3, wherein the processor is further configured to detect, through the sensor unit, an input in which an external object approaches or contacts at least one antenna of the plurality of antennas having different main emission directions.

5. The electronic device of claim 4, wherein the processor is further configured to receive, through the sensor unit, sensor information including a position value of detection of approach to or contact with the electronic device by the external object and a sensor value according to the proximity or contact.

6. The electronic device of claim 5, wherein the electronic device is a flexible device, and
the processor is further configured to detect a bending signal of the flexible device and an input in which the external object approaches or contacts at least one antenna according to the bending signal through the sensor unit disposed at a position at which the plurality of antennas having different main emission directions are provided.

7. The electronic device of claim 1, wherein the processor is further configured to control the switch unit to sequentially switch, based on the predetermined schedule, at least one antenna corresponding to a frequency band supported by the communication unit among the plurality of antennas having different main emission directions.

8. The electronic device of claim 1, wherein the processor is further configured to:
generate a second schedule based on a predetermined receive signal strength reference value, when a receive signal strength of at least one antenna of the plurality of antennas having different main emission directions reduces, and
switch the plurality of antennas based on the second schedule in order to transmit the wireless signal through the plurality of antennas having different main emission directions.

9. The electronic device of claim 8, wherein the processor is further configured to:
measure the receive signal strength of at least one antenna having reduced receive signal strength, when the receive signal strength of the at least one antenna reduces, and
adjust a time that the wireless signal is transmitted and received using at least one antenna having reduced receive signal strength based on the receive signal strength reference value.

10. The electronic device of claim 1, wherein the processor is further configured to:
measure a power value of the plurality of antennas while sequentially switching the plurality of antennas based on the predetermined schedule, and
control the switch unit not to switch at least one antenna having a reduced power value, and to sequentially switch remaining antenna except for the at least one antenna, among the plurality of antennas, based on the predetermined schedule, when the power value of the at least one antenna reduces.

11. The electronic device of claim 1, wherein the processor is further configured to:
determine a power reference value corresponding to a reduced power value of at least one antenna based on a predetermined power reference value, when a power value of the at least one antenna of the plurality of antennas having different main emission directions reduces,
generate a second schedule based on the determined power reference value, and
switch the plurality of antennas based on the second schedule, in order to transmit the wireless signal through the plurality of antennas having different main emission directions.

12. The electronic device of claim 1, wherein the communication unit comprises a plurality of communication units which transmit and receive wireless signals of different frequency bands.

13. A method of switching an antenna for specific absorption rate (SAR) reduction of an electronic device, the method comprising:
at a predetermined schedule, sequentially switching a plurality of antennas, having different main emission directions, at the same time interval for a specific time when transmitting a wireless signal.

14. The method of claim 13, further comprising:
determining whether a receive signal strength of at least one antenna of the plurality of antennas reduces to a reference value or less while sequentially switching the plurality of antennas having different main emission directions based on the predetermined schedule; and
sequentially switching at least one antenna, except for at least one antenna having receive signal strength reduced to be less than or equal to the reference value, among the plurality of antennas, based on the predetermined schedule, when the receive signal strength of the at least one antenna reduces to be less than or equal to the reference value.

15. The method of claim 14, wherein determining whether receive signal strength of at least one antenna of the plurality of antennas reduces to a reference value or less comprises:
receiving sensor information;
measuring receive signal strength of at least one antenna corresponding to the sensor information among the plurality of antennas having different main emission directions; and
comparing the measured receive signal strength of at least one antenna and the reference value and determining whether receive signal strength of the at least one antenna reduces to be less than or equal to the reference value.

16. The method of claim 14, wherein sequentially switching at least one antenna, except for at least one antenna having receive signal strength reduced to the reference value or less among the plurality of antennas, based on the predetermined schedule comprises sequentially switching, based on the predetermined schedule, at least one antenna corresponding to a frequency band supported by a communication unit among the plurality of antennas having different main emission directions.

17. The method of claim 13, further comprising:
generating a second schedule based on a predetermined receive signal strength reference value, when the receive signal strength of the at least one antenna of the plurality of antennas having different main emission directions reduces; and
switching the plurality of antennas having different main emission directions based on the second schedule.

18. The method of claim 17, wherein generating a second schedule based on a predetermined receive signal strength reference value comprises:
measuring receive signal strength of at least one antenna having reduced receive signal strength, when the receive signal strength of the at least one antenna reduces; and
adjusting a time that the wireless signal is transmitted and received using the at least one antenna having the reduced receive signal strength, based on the receive signal strength reference value.

19. The method of claim 13, further comprising:
measuring a power value of the plurality of antennas while sequentially switching the plurality of antennas based on the predetermined schedule; and
sequentially switching at least one antenna, except for at least one antenna having a reduced power value among the plurality of antennas, based on the predetermined schedule, when a power value of the at least one antenna reduces.

20. The method of claim 13, further comprising:
determining a power reference value corresponding to the reduced power value of the at least one antenna based on a predetermined power reference value, when the power value of the at least one antenna of the plurality of antennas having different main emission directions reduces;
generating a second schedule based on the determined power reference value; and
switching the plurality of antennas based on the second schedule, in order to transmit the wireless signal through the plurality of antennas having different main emission directions.

* * * * *